United States Patent
Hong et al.

(10) Patent No.: US 10,291,352 B2
(45) Date of Patent: May 14, 2019

(54) APPARATUS AND METHOD FOR TRANSMITTING AND RECEIVING SIGNAL IN WIRELESS COMMUNICATION SYSTEM SUPPORTING HYBRID AUTOMATIC REPEAT REQUEST SCHEME

(71) Applicant: Samsung Electronics Co., Ltd., Gyeonggi-do (KR)

(72) Inventors: Sung-Nam Hong, Anyang-si (KR); Tae-Young Kim, Seoul (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 15/449,794

(22) Filed: Mar. 3, 2017

(65) Prior Publication Data

US 2017/0257185 A1   Sep. 7, 2017

(30) Foreign Application Priority Data

Mar. 4, 2016   (KR) ........................ 10-2016-0026134

(51) Int. Cl.
*H04L 1/00* (2006.01)
*G06F 11/10* (2006.01)
(Continued)

(52) U.S. Cl.
CPC ........ *H04L 1/0045* (2013.01); *G06F 11/1004* (2013.01); *H04L 1/08* (2013.01); *H04L 1/1607* (2013.01); *H04L 1/1671* (2013.01); *H04L 1/1825* (2013.01); *H04L 1/1896* (2013.01); *H04L 1/0061* (2013.01);
(Continued)

(58) Field of Classification Search
None
See application file for complete search history.

(56) References Cited

U.S. PATENT DOCUMENTS

2008/0318531 A1   12/2008   Kaminski et al.
2010/0215007 A1   8/2010   Zhang et al.
(Continued)

FOREIGN PATENT DOCUMENTS

KR   10-2016-0140290 A   12/2016

OTHER PUBLICATIONS

Foreign Communication from Related Counterpart Application; PCT Application No. PCT/KR2017/002337; International Search Report dated May 23, 2017; 3 pages.
(Continued)

*Primary Examiner* — Daniel F. McMahon

(57) ABSTRACT

The present disclosure relates to a pre-5th-generation (5G) or 5G communication system to be provided for supporting higher data rates beyond 4th-generation (4G) communication system such as a long term evolution (LTE). A method for transmitting a signal in transmitting apparatus in a wireless communication system supporting a hybrid automatic repeat request (HARQ) scheme is provided. The method includes transmitting a signal to a receiving apparatus; detecting there is a need for a retransmission operation for the signal; and performing the retransmission operation for the signal based on at least one of a reception scheme used in the receiving apparatus or an interference characteristic of an interference signal.

5 Claims, 19 Drawing Sheets

(51) Int. Cl.
*H04L 1/08* (2006.01)
*H04L 1/16* (2006.01)
*H04L 1/18* (2006.01)
H04L 1/20 (2006.01)

(52) U.S. Cl.
CPC .......... *H04L 1/0071* (2013.01); *H04L 1/1819* (2013.01); *H04L 1/20* (2013.01)

(56) References Cited

U.S. PATENT DOCUMENTS

| | | | |
|---|---|---|---|
| 2011/0038302 A1* | 2/2011 | Papasakellariou | H04L 5/0007 370/315 |
| 2011/0310833 A1* | 12/2011 | Lee | H04L 1/1829 370/329 |
| 2012/0275322 A1 | 11/2012 | Ji et al. | |
| 2013/0021987 A1 | 1/2013 | Ho et al. | |
| 2013/0301401 A1* | 11/2013 | Wang | H04L 5/001 370/209 |
| 2014/0245095 A1* | 8/2014 | Nammi | H04L 1/1845 714/749 |
| 2015/0382362 A1 | 12/2015 | Park et al. | |
| 2016/0088604 A1* | 3/2016 | Patel | H04L 5/0053 370/336 |
| 2016/0095094 A1* | 3/2016 | Xu | H04W 72/042 370/336 |

OTHER PUBLICATIONS

Foreign Communication from Related Counterpart Application; PCT Application No. PCT/KR2017/002337; Written Opinion of International Searching Authority dated May 23, 2017; 12 pages.

\* cited by examiner

APPARATUS AND METHOD FOR TRANSMITTING AND RECEIVING SIGNAL IN WIRELESS COMMUNICATION SYSTEM SUPPORTING HYBRID AUTOMATIC REPEAT REQUEST SCHEME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Mar. 4, 2016 and assigned Serial No. 10-2016-0026134, the entire disclosure of all of which is incorporated herein by reference.

TECHNICAL FIELD

The present disclosure relates to an apparatus and method for transmitting and receiving a signal in a wireless communication system supporting a hybrid automatic repeat request (HARQ) scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In a downlink (DL)/uplink (UL) in a wireless communication system supporting an orthogonal frequency division multiple access (OFDMA) scheme, inter-cell interference (ICI) may significantly degrade performance of a signal receiving apparatus. If a reference signal (RS), e.g., a pilot signal used for estimating a channel or measuring the channel in the signal receiving apparatus is distorted due to effect of the ICI, performance of the signal receiving apparatus may be significantly degraded.

For example, most of communication systems supporting an OFDMA scheme such as an LTE use various schemes, e.g., a scheme of differently setting a location of an RS used in each of cells, a scheme of power boosting an RS compared to a data signal, e.g., a data symbol, and/or the like for minimizing distortion of the RS in a situation in which there is ICI.

For example, a DL in an LTE mobile communication system defines that neighbor base stations (BSs) shift cell-specific reference signals (CRSs) on a frequency axis on a specific CRS based on different offsets to transmit the shifted CRSs, and a BS power boosts a CRS with transmission power greater than transmission power applied to a data signal to transmit the power boosted CRS. The term BS may be interchangeable with the term node B, evolved node B (eNB), evolved universal terrestrial radio access network (E-UTRAN) node B (eNB), access point (AP), and the like.

The schemes as described above decrease a degree in which an RS is distorted due to ICI, so the schemes may prevent relatively significant degradation of channel estimation performance and channel measurement performance of a signal receiving apparatus.

However, the power boosted RS as described above operates as ICI to a data signal included in a target signal, so the power boosted RS results in a non-Gaussian characteristic of an interference signal.

Meanwhile, most of current communication standards supporting an OFDMA scheme differently set locations of RSs used in neighbor cells, so effect of boosted interference RS is not reflected in a received RS.

So, in a general LTE mobile communication system, a channel decoding operation using a log-likelihood ratio (LLR) calculated on an interference environment which has a non-Gaussian characteristic may not reflect effect of a boosted interference RS, so the channel decoding operation may significantly degrade channel decoding performance of a signal receiving apparatus.

In a general LTE mobile communication system, a scheme of retransmitting a signal based on an HARQ scheme has been implemented. In the general LTE mobile communication system, a retransmitting operation may be performed based on one of HARQ retransmission schemes, e.g., a chase combining (CC) scheme, an incremental redundancy (IR) scheme, a partial IR scheme, and/or the like. All of the CC scheme, the IR scheme, and the partial IR scheme are suitable for a case that it is difficult to detect a damaged part of a codeword transmitted by a signal transmitting apparatus, and a damage due to a channel and a damage due to an interference signal regularly occur within one codeword.

As described above, in the DL/UL network which is based on the OFDMA scheme, a case that a statistical characteristic of an interference signal does not regularly damage a codeword frequently occurs. For example, whether an interference signal is conflicted may be varied on a resource block (RB) basis, so a degree in which a signal is damaged may be varied on an RB basis within a codeword. Further, there is a reference signal (RS) which needs to be transmitted within an RB, so an interference characteristic and a degree in which a signal is damaged due to this may be varied per resource element (RE) group.

However, retransmission schemes proposed up to now do not consider an interference characteristic.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for transmitting and receiving a signal in a wireless communication system supporting an HARQ scheme.

Another aspect of the present disclosure is to propose an apparatus and method for transmitting and receiving a signal based on an interference characteristic in a wireless communication system supporting an HARQ scheme.

Another aspect of the present disclosure is to propose an apparatus and method for transmitting and receiving a signal based on a reception scheme in a wireless communication system supporting an HARQ scheme.

Another aspect of the present disclosure is to propose an apparatus and method for transmitting and receiving a signal based on resource element (RE) grouping in a wireless communication system supporting an HARQ scheme.

Another aspect of the present disclosure is to propose an apparatus and method for transmitting and receiving a signal based on a reliability for an RE group in a wireless communication system supporting an HARQ scheme.

In accordance with an aspect of the present disclosure, a method for transmitting a signal in transmitting apparatus in a wireless communication system supporting a hybrid automatic repeat request (HARQ) scheme is provided. The method includes transmitting a signal to a receiving apparatus; detecting there is a need for a retransmission operation for the signal; and performing the retransmission operation for the signal based on at least one of a reception scheme used in the receiving apparatus or an interference characteristic of an interference signal.

In accordance with another aspect of the present disclosure, a method for receiving a signal in a receiving apparatus in a wireless communication system supporting a hybrid automatic repeat request (HARQ) scheme is provided. The method includes receiving a signal from a transmitting apparatus; generating feedback information for the signal based on at least one of a reception scheme used in the receiving apparatus or an interference characteristic of an interference signal; and transmitting the feedback information to the transmitting apparatus.

In accordance with another aspect of the present disclosure, a transmitting apparatus in a wireless communication system supporting a hybrid automatic repeat request (HARQ) scheme is provided. The transmitting apparatus includes a processor configured to transmit a signal to a receiving apparatus, to detect there is a need for a retransmission operation for the signal, and to perform the retransmission operation for the signal based on at least one of a reception scheme used in the receiving apparatus or an interference characteristic of an interference signal.

In accordance with another aspect of the present disclosure, a receiving apparatus in a wireless communication system supporting a hybrid automatic repeat request (HARQ) scheme is provided. The receiving apparatus includes a processor configured to receive a signal from a transmitting apparatus, to generate feedback information for the signal based on at least one of a reception scheme used in the receiving apparatus or an interference characteristic of an interference signal, and to transmit the feedback information to the transmitting apparatus.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
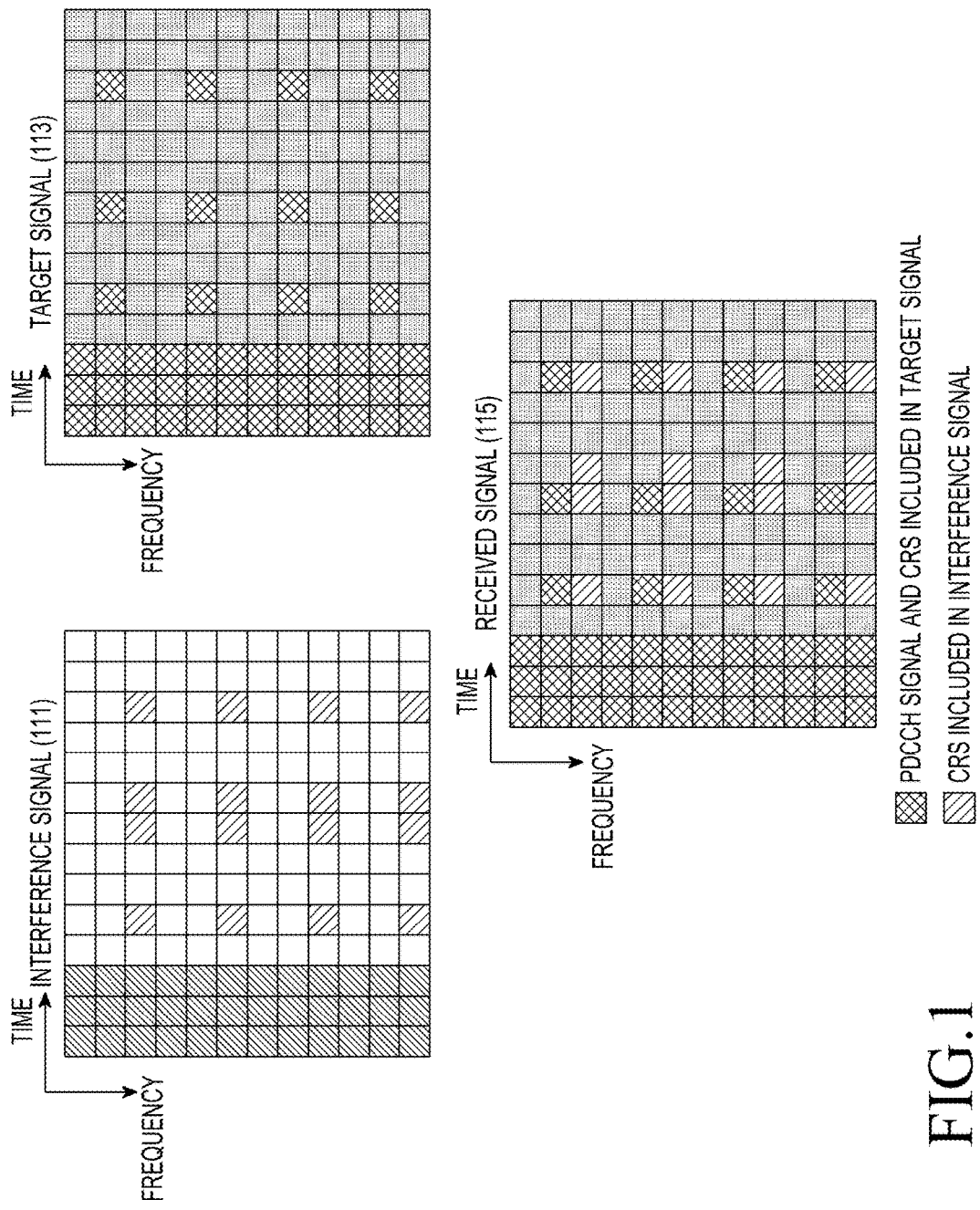
FIG. 1 illustrates relation among an interference signal, a target signal, and a received signal in an LTE mobile communication system.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be, for example, a user equipment (UE), and a signal transmitting apparatus may be, for example, a base station (BS). The term BS may be interchangeable with the term access point (AP), node B, evolved node B (eNB), evolved universal terrestrial radio access network (E-UTRAN) node B (eNB), and the like. The term UE may be interchangeable with the term terminal, device, wireless device, mobile device, mobile station (MS), and/or the like. The term signal transmitting apparatus may be interchangeable with the term transmitting apparatus, transmitting device, and/or the like. The term signal receiving apparatus may be interchangeable with the term receiving apparatus, receiving device, and/or the like.

An embodiment of the present disclosure proposes an apparatus and method for transmitting and receiving a signal in a wireless communication system supporting a hybrid automatic repeat request (HARQ) scheme.

An embodiment of the present disclosure proposes an apparatus and method for transmitting and receiving a signal based on an interference characteristic in a wireless communication system supporting an HARQ scheme.

An embodiment of the present disclosure proposes an apparatus and method for transmitting and receiving a signal based on a reception scheme in a wireless communication system supporting an HARQ scheme.

An embodiment of the present disclosure proposes an apparatus and method for transmitting and receiving a signal based on resource element (RE) grouping in a wireless communication system supporting an HARQ scheme.

An embodiment of the present disclosure proposes an apparatus and method for transmitting and receiving a signal based on a reliability for an RE group in a wireless communication system supporting an HARQ scheme.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSUPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

In a wireless communication system supporting an orthogonal frequency division multiple access (OFDMA) scheme, a power-boosted reference signal (RS) operates as ICI to a data signal included in a target signal, so the power-boosted RS results in occurrence of a non-Gaussian characteristic of an interference signal. This will be described with reference to FIGS. 1 and 2.

Relation among an interference signal, a target signal, and a received signal in an LTE mobile communication system will be described with reference to FIG. 1.

FIG. 1 illustrates relation among an interference signal, a target signal, and a received signal in an LTE mobile communication system.

Referring to FIG. 1, it will be noted that all of an interference signal, a target signal, and a received signal are illustrated on a resource block (RB) basis. Here, an RB includes at least one resource element (RE).

An interference signal 111 denotes a signal transmitted from a neighbor cell. For example, the interference signal 111 includes a physical downlink control channel (PDCCH) signal and a CRS transmitted from the neighbor cell.

A target signal 113 denotes a signal transmitted from a corresponding cell. For example, the target signal 113 includes a PDCCH signal and a CRS transmitted from the corresponding cell.

A received signal 115 denotes a signal received by a corresponding signal receiving apparatus, e.g., a user equipment (UE), and the received signal 115 includes the PDCCH signal and the CRS included in the target signal 113 and the PDCCH signal and the CRS included in the interference signal 111.

In the LTE mobile communication system, locations of CRSs are differently set among neighbor cells, so specific REs among REs included in an RB through which the target signal 113 is transmitted may be affected by the CRS included in the interference signal 111 and may be additionally affected by the PDCCH signal included in the interference signal 111 according to a situation.

Relation among an interference signal, a target signal, and a received signal in an LTE mobile communication system has been described with reference to FIG. 1, and ICI distribution for an RE group which is affected by an interference CRS in an LTE mobile communication system will be described with reference to FIG. 2.

Figure 2:
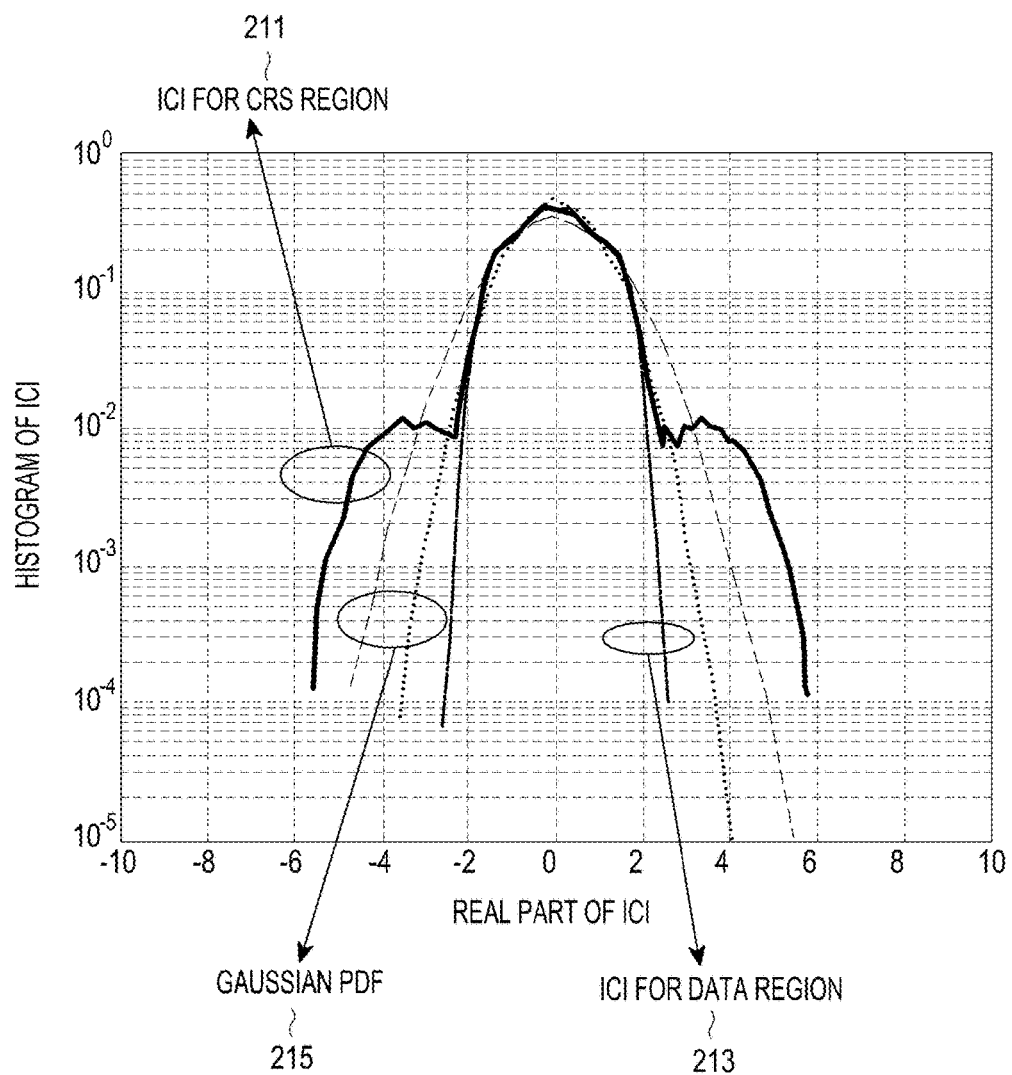
FIG. 2 illustrates ICI distribution for an RE group which is affected by an interference CRS in an LTE mobile communication system.

FIG. 2 illustrates ICI distribution for an RE group which is affected by an interference CRS in an LTE mobile communication system.

Referring to FIG. 2, an ICI distribution graph in FIG. 2 indicates an ICI distribution graph for an RE group in a case that a signal receiving apparatus, e.g., a UE uses one antenna port and the number of neighbor cells is equal to 1. In the ICI distribution graph in FIG. 2, a vertical axis indicates a histogram of ICI, and a horizontal axis indicates a real part of the ICI.

Generally, a CRS is boosted with power which is greater than power applied to a data signal by a preset value, e.g., 9 [dB]. So, a CRS transmitted in a neighbor cell may operate as ICI to an RB through which a target signal of a corresponding cell is transmitted, i.e., specific REs among REs includes in a target RB, and occurs a non-Gaussian characteristic of an interference signal.

As described in FIG. 2, it will be understood that ICI 213 for a data region indicates a Gaussian characteristic, and ICI 211 for a CRS region indicates a non-Gaussian characteristic. In FIG. 2, a reference sign 215 indicates a Gaussian probability density function (PDF).

ICI distribution for an RE group which is affected by an interference CRS in an LTE mobile communication system has been described with reference to FIG. 2, and a process of performing a channel decoding operation in a signal receiving apparatus in an interference environment which has a non-Gaussian characteristic in an LTE mobile communication system will be described with reference to FIG. 3.

Figure 3:
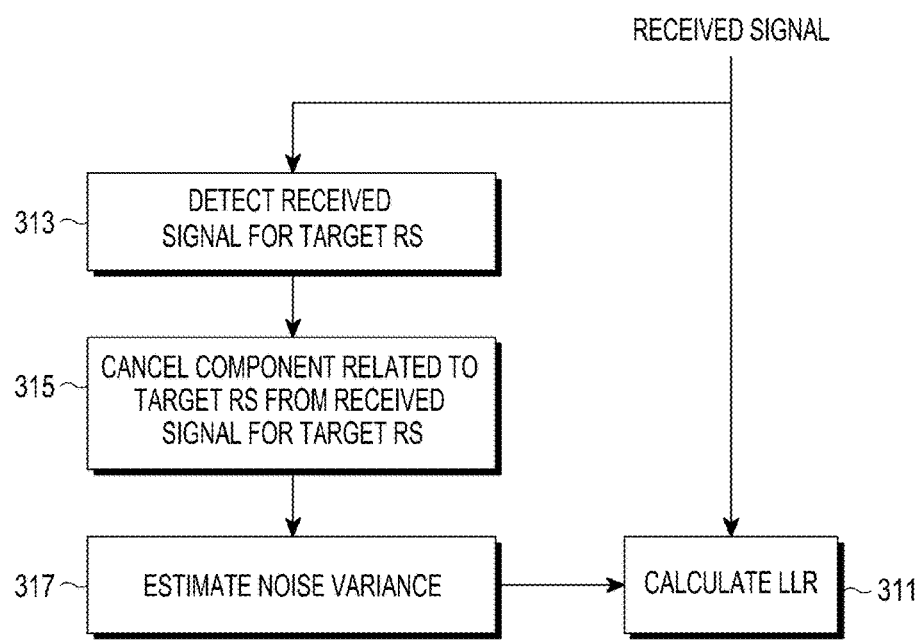
FIG. 3 illustrates a process of performing a channel decoding operation in a signal receiving apparatus in an interference environment which has a non-Gaussian characteristic in an LTE mobile communication system.

FIG. 3 illustrates a process of performing a channel decoding operation in a signal receiving apparatus in an interference environment which has a non-Gaussian characteristic in an LTE mobile communication system.

Referring to FIG. 3, a signal receiving apparatus calculates a log-likelihood ratio (LLR) for a received signal at operation 311, and this will be described below.

The signal receiving apparatus detects a received signal for a target RS from the received signal at operation 313, and proceeds to operation 315. Here, the target RS denotes an RS transmitted on a cell to which the signal receiving apparatus belongs, i.e., a serving cell. The signal receiving apparatus cancels a component related to the target RS from the received signal for the target RS at operation 315, and proceeds to operation 317.

The signal receiving apparatus estimates variance of noise in which an effect of ICI is included based on the target RS at operation 317, and proceeds to operation 311. The signal receiving apparatus calculates a soft-decision decoding metric, e.g., an LLR for the received signal by applying a Gaussian PDF based on the estimated variance of the noise at operation 311.

A channel decoding operation in a signal receiving apparatus as described in FIG. 3 is a channel decoding operation in a case that location information for an RS transmitted by a neighbor cell may not be provided to the signal receiving apparatus.

In most of communication standards supporting an orthogonal frequency division multiple access (OFDMA) scheme, locations of RSs used in neighbor cells are differently set, so affection of power-boosted interference RS is not reflected in a received RS.

So, a channel decoding operation using a log-likelihood ratio (LLR) calculated in an interference environment which has a non-Gaussian characteristic in a general LTE mobile communication system is impossible to reflect affection of boosted interference RS, so this may significantly degrade channel decoding performance of a signal receiving apparatus.

Currently, an LTE mobile communication system has implemented a scheme of retransmitting a signal based on an HARQ scheme.

A process of retransmitting a signal based on an HARQ scheme in an LTE mobile communication system will be described with reference to FIG. 4.

Figure 4:
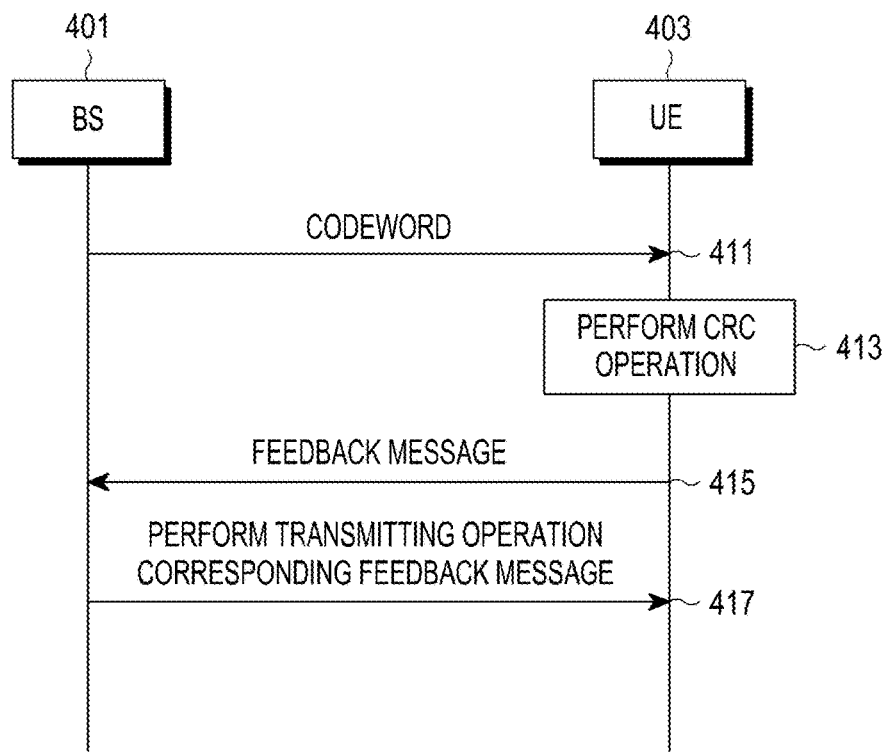
FIG. 4 illustrates a process of retransmitting a signal based on an HARQ scheme in an LTE mobile communication system.

FIG. 4 illustrates a process of retransmitting a signal based on an HARQ scheme in an LTE mobile communication system.

Referring to FIG. 4, the LTE mobile communication system includes a BS 401 and a UE 403.

The BS 401 transmits a codeword to the UE 403 at operation 411. After receiving the codeword from the BS 410, the UE 403 performs a cyclic redundancy check (CRC) operation on the codeword at operation 413. The UE 403 transmits a feedback message including acknowledgment (ACK) information for the codeword or negative-acknowledgment (NACK) information for the codeword based on a CRC result at operation 415. If the CRC result indicates CRC pass, the UE 403 includes the ACK information into the feedback message. If the CRC result indicates CRC fail, the UE 403 includes the NACK information into the feedback message. The feedback message includes a channel quality indicator (CQI) which is measured by the UE 403 based on the received codeword.

Meanwhile, the BS 401 performs a transmitting operation which corresponds to the feedback message received from the UE 403. That is, if the feedback message which the BS 401 receives from the UE 403 includes NACK information, the BS 401 may perform a retransmitting operation for the codeword based on one of HARQ retransmission schemes, e.g., a chase combining (CC) scheme, an incremental redundancy (IR) scheme, a partial IR scheme, and/or like at operation 417. Each of the CC scheme, the IR scheme, and the partial IR scheme will be described below.

Firstly, the CC scheme will be described below.

In the CC scheme, if a CRC result for a message received in a signal receiving apparatus indicates CRC fail, a signal transmitting apparatus retransmits the message, and the signal receiving apparatus combines the retransmitted message and a previously received message based on a maximal ratio combining scheme, and performs a decoding operation on the combined message.

Secondly, the IR scheme will be described below.

In the IR scheme, a signal transmitting apparatus firstly transmits a part of a specific codeword, and transmits a part of a redundancy included in the specific codeword which is not transmitted by the signal transmitting apparatus if a signal receiving apparatus detects that CRC fail occurs for the part of the specific codeword. Here, the part of the specific codeword is channel decodable. Then, the signal receiving apparatus assembles the part of the specific codeword previously received and the part of the redundancy newly received, and performs a decoding operation on the assembled message.

Thirdly, the partial IR scheme will be described below.

The partial IR scheme is a scheme which is currently used in the LTE mobile communication system. In the partial IR scheme, a signal transmitting apparatus divides one codeword into a plurality of blocks which may be independently decoded, i.e., a plurality of blocks which are self-decodable, and transmits a specific block of the plurality of blocks. Upon detecting that CRC fail has occurred for the specific black in a signal receiving apparatus, the signal transmitting apparatus transmits other block from the plurality of blocks except for the specific block. If the signal receiving apparatus is capable of using the previously received block, the signal receiving apparatus assembles the previously received block and a newly received block as a message and performs a decoding operation on the assembled message. If the signal receiving apparatus is not capable of using the previously received block, the signal receiving apparatus performs the decoding operation on only the newly received block.

As described in FIG. 3, an embodiment of the present disclosure proposes a scheme of generating resource elements (REs) likely to be affected by a boosted interference RS among resources allocated to an RS, e.g., REs an RE group, and estimating a statistical characteristic of an interference signal and a noise component per RE group to generate an LLR. This will be described with reference to FIG. 5.

Figure 5:
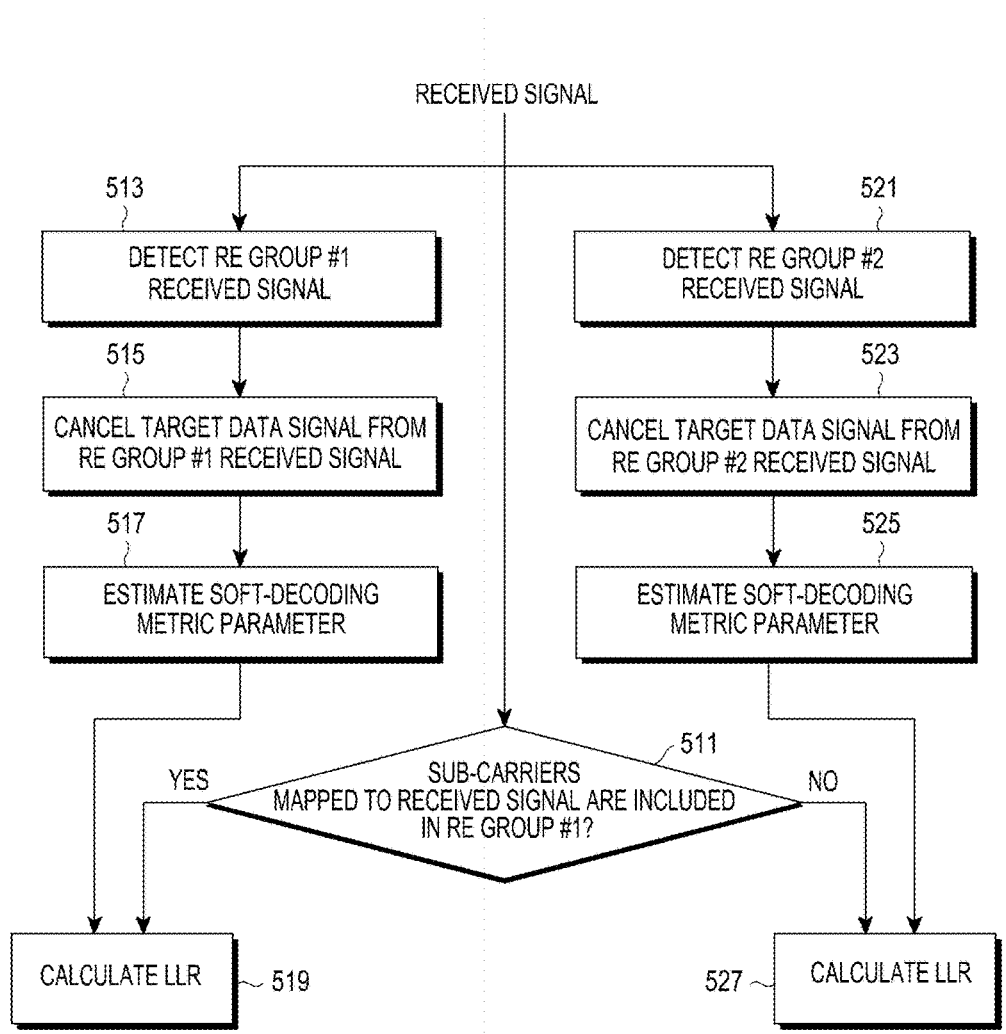
FIG. 5 illustrates a process of generating a soft-decision decoding metric in a signal receiving apparatus in an communication system supporting an OFDMA scheme according to an embodiment of the present disclosure.

FIG. 5 illustrates a process of generating a soft-decision decoding metric in a signal receiving apparatus in an communication system supporting an OFDMA scheme according to an embodiment of the present disclosure.

Referring to FIG. 5, it will be noted that a process of generating a soft-decision decoding metric in a signal receiving apparatus is a process of generating a soft-decision decoding metric in a signal receiving apparatus regardless of whether location information for an interference RS is provided to the signal receiving apparatus.

Upon receiving a received signal, the signal receiving apparatus determines whether sub-carriers to which the received signal is mapped are included in an RE group #1 at operation 511. If the sub-carriers to which the received signal is mapped are included in the RE group #1, the signal receiving apparatus proceeds to operation 519. If the sub-carriers to which the received signal is mapped are not included in the RE group #1, that is, if the sub-carriers to which the received signal is mapped are included in an RE group #2, the signal receiving apparatus proceeds to operation 527.

Each of the RE group #1 and the RE group #2 will be described below.

An RE group includes at least one RE, and an RE may be, for example, a sub-carrier. In an embodiment of the present disclosure, it will be assumed that the RE is the sub-carrier because the communication system supports the OFDMA scheme. However, if the communication system does not support the OFDMA scheme, the RE may be other resource, not the sub-carrier.

The RE group #1 includes REs, and a signal received through the REs is not affected by a boosted interference signal. The boosted interference signal may be, for example, a target RS, an interference RS, and/or the like.

The RE group #2 includes REs, and a signal received through the REs is likely to be affected by the boosted interference signal.

For example, in a downlink of an LTE mobile communication system, locations of sub-carriers through a cell-specific reference signal (CRS) is transmitted are determined based on a cell identifier (ID) of a corresponding cell. Further, the locations of sub-carriers through the CRS is transmitted are determined based on a limited pattern.

So, a signal receiving apparatus, e.g., a UE may detect sub-carriers likely to be affected by a CRS, and this sub-carriers may be included in the RE group #2 . That is, sub-carriers mapped to a CRS transmitted by a serving cell to which the UE currently belongs, i.e., a target CRS and sub-carriers mapped to a CRS transmitted by a neighbor cell, i.e., an interference CRS may be included in the RE group #2.

A RE grouping process of generating the RE group #1 and the RE group #2 will be described below, so a detailed description thereof will be omitted herein.

The signal receiving apparatus detects a received signal which corresponds to the RE group #1 from the received signal at operation 513, and proceeds to operation 515. For convenience, the received signal which corresponds to the RE group #1 will be referred to as "RE group #1 received signal". The signal receiving apparatus cancels a target data signal from the RE group #1 received signal at operation 515, and proceeds to operation 517. The target data signal denotes a data signal transmitted by a signal transmitting apparatus, and the signal receiving apparatus has estimated previously. There are no REs through which a CRS is transmitted in the RE group #1, so there is no RS used for estimating a statistical characteristic of interference and noise variance. So, the signal receiving apparatus previously performs a hard-decision operation or a soft-decision operation on a received signal to estimate the target data signal.

The signal receiving apparatus estimates a soft-decision decoding metric parameter, e.g., noise variance, a shape parameter $\alpha$ of a complex-generalized Gaussian (CGG) probability density function (PDF), a scale parameter $\beta$ of the CGG PDF, and/or the like based on an RE group #1 received signal in which the target data signal is canceled, and proceeds to operation 519. The CGG PDF is a typical non-Gaussian PDF.

If the signal receiving apparatus calculates an LLR based on a Gaussian PDF, the soft-decision decoding metric parameter estimated at operation 517 may be the noise variance. If the signal receiving apparatus calculates an LLR based on a non-Gaussian PDF, the soft-decision decoding metric parameter estimated at operation 517 may be parameters of the CGG PDF, i.e., the shape parameter $\alpha$ and scale parameter $\beta$ of the CGG PDF.

The signal receiving apparatus calculates a soft-decision decoding metric, i.e., an LLR for the received signal based on the estimated soft-decision decoding metric parameter at operation 519.

The signal receiving apparatus detects a received signal which corresponds to the RE group #2 from the received signal at operation 521, and proceeds to operation 523. For convenience, the received signal which corresponds to the RE group #2 will be referred to as "RE group #2 received signal". As described above, the RE group #2 includes REs, and a signal received through the REs is likely to be affected by a boosted interference signal. So, REs through which a CRS transmitted by a serving cell to which the signal receiving apparatus belongs, i.e., a target CRS is received are included in the RE group #2.

However, there is a high possibility that a characteristic of an interference signal which affects the target CRS may be significantly different from a characteristic of an interference signal which affects a target data signal. The reason why is that a location of an RS is determined such that the RS and a boosted interference signal are not conflicted for preventing distortion of the RS in most standards supporting an OFDMA scheme. So, a process similar to a process in the RE group #1 may be performed for the RE group #2 for estimating a characteristic of an interference signal which affects REs through which a data signal is received and which are included in the RE group #2.

That is, the signal receiving apparatus cancels a target data signal from a RE group #2 received signal at operation 523, and proceeds to operation 525. The signal receiving apparatus estimates a soft-decoding metric parameter, e.g., noise variance, a shape parameter $\alpha$ of a CGG PDF, a scale parameter $\beta$ of the CGG PDF, and/or the like based on a RE group #2 received signal in which the target data signal is canceled at operation 525, and proceeds to operation 527. If the signal receiving apparatus calculates an LLR based on a Gaussian PDF, the soft-decoding metric parameter estimated at operation 525 may be the noise variance. If the signal receiving apparatus calculates an LLR based on a non-Gaussian PDF, the soft-decoding metric parameter estimated at operation 525 may be parameters of the CGG PDF, i.e., the shape parameter $\alpha$ of the CGG PDF and the scale parameter $\beta$ of the CGG PDF.

The signal receiving apparatus calculates a soft-decoding metric, i.e., an LLR for the received signal based on the estimated soft-decoding metric parameter at operation 527.

Although FIG. 5 illustrates a process of generating a soft-decision decoding metric in a signal receiving apparatus in an communication system supporting an OFDMA scheme according to an embodiment of the present disclosure, various changes could be made to FIG. 5. For example, although shown as a series of operations, various operations in FIG. 5 could overlap, occur in parallel, occur in a different order, or occur multiple times.

Meanwhile, an RE group #2 received signal as described in FIG. 5 may be affected by a relatively strong-boosted interference signal or a relatively weak-boosted interference signal. So, there is a high possibility that a non-Gaussian characteristic of an interference signal may occur for the RE group #2 received signal.

So, a case that a signal receiving apparatus calculates an LLR for the RE group #2 received signal based on a non-Gaussian PDF may be advantageous in a view of performance improvement compared to a case that the signal receiving apparatus calculates the LLR for the RE group #2 received signal based on a Gaussian PDF. Even though the case that the signal receiving apparatus calculates the LLR for the RE group #2 received signal based on the non-Gaussian PDF is more advantageous in the view of performance improvement, the signal receiving apparatus may calculate an LLR based on the Gaussian PDF, not the non-Gaussian PDF for decreasing implementation complexity.

As described above, a signal receiving apparatus may generate a soft-decoding metric by applying different Gaussian PDFs, i.e., different soft-decoding metric generating schemes to an RE group #1 and an RE group #2.

As described above, in an embodiment of the present disclosure, REs used in a communication system are generated as RE groups based on a predetermined criterion, and PDFs applied to the RE groups are determined based on a characteristic of the RE groups. The predetermined criterion may be, for example, an interference characteristic, and/or the like. So, in an embodiment of the present disclosure, an LLR which is best for a corresponding RE may be calculated. An RE grouping process of generating REs as RE groups and an operation of determining a soft-decision decoding metric generating scheme applied to a corresponding RE group will be described below, and a detailed description thereof will be omitted herein.

As described above, an embodiment of the present disclosure proposes a scheme of calculating a soft-decoding metric by applying a soft-decoding metric generating scheme suitable for each RE group. So, a scheme of estimating an interference signal and a scheme of generating a soft-decoding metric, e.g., a scheme of calculating an LLR for each RE group are similar.

So, an interference signal estimating scheme and an LLR calculating scheme proposed in an embodiment of the present disclosure will be described, for example, for an RE group #1 as an RE group including REs which are not affected by a boosted interference signal.

In a case that it will be assumed that the kth received signal as an RE group#1 received signal among total received signals is y[k], a received signal in which a target data signal is canceled from the kth received signal, i.e., a signal including an interference signal and background noise may be expressed as Equation (1).

$$\hat{z}[k] = y[k] - \hat{H}[k]\hat{s}[k] \qquad \text{Equation (1)}$$

In Equation (1), $\hat{z}[k]$ denotes a received signal in which a target data signal is canceled from the kth received signal, $\hat{H}[k]$ denotes a fading channel estimation value, and $\hat{s}[k]$ denotes a hard-decision (or soft-decision) value.

So, a signal receiving apparatus may estimate a characteristic of an interference signal based on $\hat{z}[k]$. If the signal receiving apparatus calculates an LLR after assuming that $\hat{z}[k]$ is a Gaussian random variable, the signal receiving apparatus needs to estimate variance for $\hat{z}[k]$.

If the signal receiving apparatus calculates an LLR based on a CGG PDF after assuming that $\hat{z}[k]$ is a non-Gaussian random variable, the signal receiving apparatus needs to estimate a shape parameter $\alpha$ and a scale parameter $\beta$ of the CGG PDF based on the $\hat{z}[k]$. A process of estimating the shape parameter $\alpha$ and the scale parameter $\beta$ of the CGG PDF based on the $\hat{z}[k]$ may be expressed as Equation (2).

$$\alpha = \frac{\ln(3^6/2^{10})}{\ln\left(\frac{\left(\frac{1}{N}\sum_{k=1}^{N}|\hat{z}[k]|\right)^2}{\frac{1}{N}\sum_{k=1}^{N}|\hat{z}[k]|^2} - \frac{\pi}{4} + \frac{9}{2^{3.5}}\right) + \ln\left(\frac{3}{2\sqrt{2}}\right)}, \qquad \text{Equation (2)}$$

$$\beta = \frac{\Gamma(2/\alpha)}{\Gamma(3/\alpha)}\frac{1}{N}\sum_{k=1}^{N}|\hat{z}[k]|$$

In Equation (2), N denotes the number of samples used as interference signals.

A process, as described above, of calculating an LLR for a binary channel code transmitted in a signal transmitting apparatus based on a characteristic of an interference signal may be expressed as Equation (3) and Equation (4).

$$L_{k,\lambda}^{G}(y[k], \hat{H}[k]) = \ln\frac{\sum_{w \in A_0^{\lambda}} f_{\hat{z}}(y[k] - \hat{H}[k]w \mid \sigma^2)}{\sum_{w \in A_1^{\lambda}} f_{\hat{z}}(y[k] - \hat{H}[k]w \mid \sigma^2)} \qquad \text{Equation (3)}$$

$$L_{k,\lambda}^{CGG}(y[k], \hat{H}[k]) = \ln\frac{\sum_{w \in A_0^{\lambda}} f_{\hat{z}}(y[k] - \hat{H}[k]w \mid \alpha, \beta)}{\sum_{w \in A_1^{\lambda}} f_{\hat{z}}(y[k] - \hat{H}[k]w \mid \alpha, \beta)} \qquad \text{Equation (4)}$$

Equation (3) indicates a process of calculating an LLR in a case that a Gaussian PDF is applied to the RE group #1, and Equation (4) indicates a process of calculating an LLR in a case that a CGG PDF is applied to the RE group #1. That is, $L_{k,\lambda}^{G}(y[k],\hat{H}[k])$ denotes the LLR calculated in the case that the Gaussian PDF is applied to the RE group #1, and $L_{k,\lambda}^{CGG}(y[k],\hat{H}[k])$ denotes the LLR calculated in the case that the Gaussian PDF is applied to the RE group #1.

The Gaussian PDF may be expressed as Equation (5).

$$f_{\hat{z}}(\hat{z}[k] \mid \sigma^2) = \frac{1}{\pi\sigma^2}\exp\left(-\frac{|\hat{z}[k]|^2}{\sigma^2}\right) \qquad \text{Equation (5)}$$

The CGG PDF may be expressed as Equation (6).

$$f_Z(\hat{z}[k] \mid \alpha, \beta) = \frac{\alpha}{2\pi\beta^2 \Gamma(2/\alpha)} \exp\left(-\left(\frac{|\hat{z}[k]|}{\beta}\right)^\alpha\right) \quad \text{Equation (6)}$$

Meanwhile, the LLR calculating scheme as described above may be simply extended with a likelihood vector for a non-binary channel code.

Performance in a case that an RE grouping process is applied in a communication system supporting an OFDMA scheme according to an embodiment of the present disclosure will be described with reference to FIG. 6.

Figure 6:
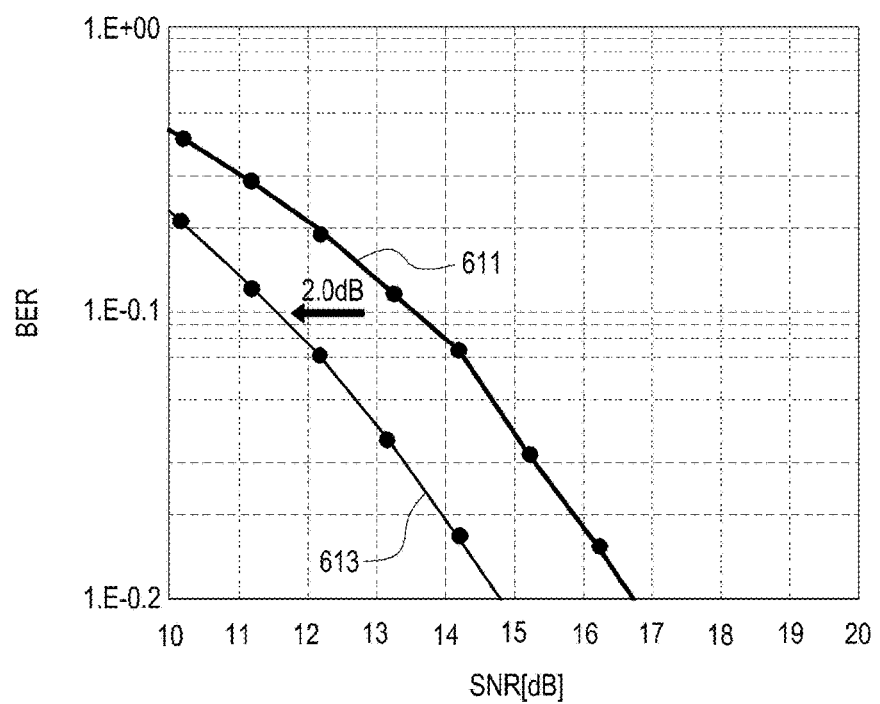
FIG. 6 illustrates performance in a case that an RE grouping process is applied in a communication system supporting an OFDMA scheme according to an embodiment of the present disclosure.

FIG. 6 illustrates performance in a case that an RE grouping process is applied in a communication system supporting an OFDMA scheme according to an embodiment of the present disclosure.

Referring to FIG. 6, it will be understood that performance 613 in a case that an RE grouping process according to an embodiment of the present disclosure is applied is enhanced by about 2 dB compared to performance 611 in a case that the RE grouping process according to an embodiment of the present disclosure is not applied.

Meanwhile, it is difficult that retransmission schemes which have been currently used in a current wireless communication system, e.g., an LTE mobile communication system, e.g., a CC scheme, an IR scheme, a partial IR scheme, and/or like detect a damaged part from a codeword transmitted in a signal transmitting apparatus and the retransmission schemes are appropriate for a case that a damage due to a channel and a damage due to an interference signal regularly occur within one codeword. In an embodiment of the present disclosure, a signal transmitted in a signal transmitting apparatus is a codeword. However, the transmitted signal may be other signal such as a transport block (TB), and/or the like as well as the codeword.

However, a statistics characteristic of an interference signal in a downlink and a uplink which are based on the OFDMA scheme may frequently generate a case that a codeword is not regularly damaged. For example, whether an interference signal is collided may be varied on a resource block (RB) basis, so a damage degree of a signal may be varied on an RB basis within a codeword.

Further, there is an RS which needs to be transmitted within an RB, so an interference characteristic may be varied per specific RE group, and a signal damage degree due to this may be varied. So, it will be expected that error performance and efficiency in a case that a damage degree of a received signal is detected per RE or RE group, and a retransmission scheme is applied based on this will be significantly improved compared to a general retransmission scheme.

In a case that an HARQ scheme is used along with a decoding metric generating scheme per RE group, a greater performance gain is expected. So, an embodiment of the present disclosure proposes an apparatus and method for transmitting and receiving a signal based on at least one of an interference characteristic and a reception scheme in a wireless communication system supporting an HARQ scheme.

A process of transmitting and receiving a signal in a wireless communication system supporting an HARQ scheme according to an embodiment of the present disclosure will be described with reference to FIG. 7. For convenience, it will be assumed that a wireless communication system is an LTE mobile communication system.

Figure 7:
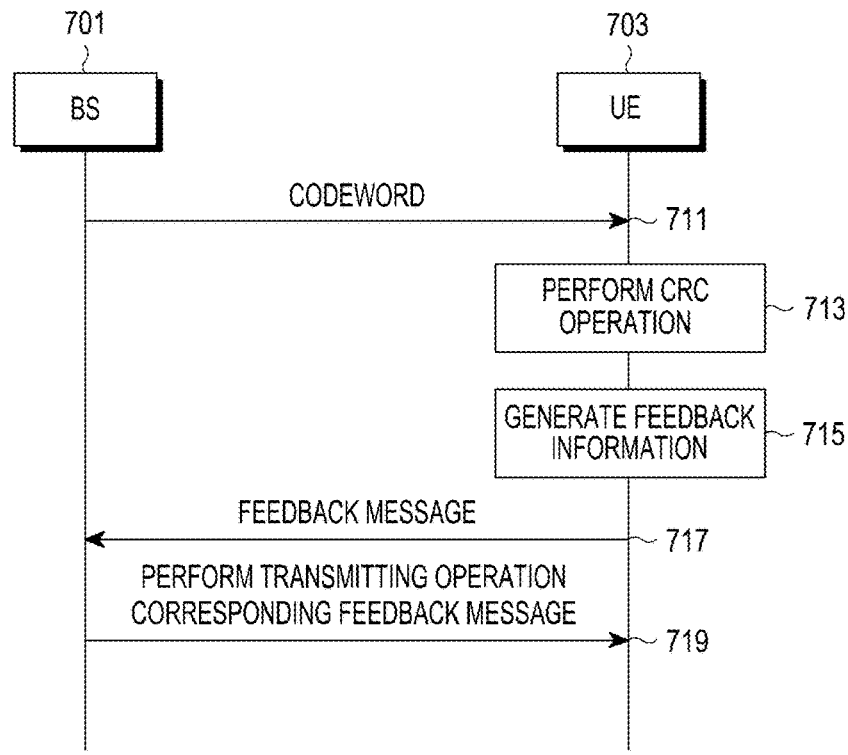
FIG. 7 illustrates a process of transmitting and receiving a signal in an LTE mobile communication system supporting an HARQ scheme according to an embodiment of the present disclosure.

FIG. 7 illustrates a process of transmitting and receiving a signal in an LTE mobile communication system supporting an HARQ scheme according to an embodiment of the present disclosure.

Referring to FIG. 7, the LTE mobile communication system includes a BS 701 and a UE 703.

The BS 701 transmits a codeword to the UE 703 at operation 711. Upon receiving the codeword from the BS 701, the UE 703 performs a cyclic redundancy check (CRC) operation on the codeword at operation 713. The UE 703 generates feedback information based on a CRC result at operation 715. The feedback information includes at least one of acknowledgment (ACK) information for the codeword or negative-acknowledgment (NACK) information for the codeword, a channel quality indicator (CQI), reception scheme information, interference characteristic related information. If the CRC result is CRC pass, the UE 703 generates the ACK information. If the CRC result is CRC fail, the UE 703 generates the NACK information.

The CQI may be generated based on various parameters such as a received signal strength indicator (RSSI), received signal code power (RSCP), reference signal received power (RSRP), reference signal received quality (RSRQ), a carrier-to-interference noise ratio (CINR), a signal-to-noise ratio (SNR), a block error rate (BLEB), and/or the like.

The reception scheme information denotes a reception scheme which is currently used by the UE 703. The reception scheme may be classified into a full-band cell-specific reference signal (CRS)-based scheme and an RE grouping-based scheme. The full-band CRS-based scheme denotes a general reception scheme which does not consider an interference characteristic, and the RE grouping-based scheme denotes a reception scheme which considers the interference characteristic and RE grouping.

The feedback information will be described below, so a detailed description thereof will be omitted herein.

The UE 703 transmits a feedback message including the feedback information to the BS 701 at operation 717. The BS 701 performs a transmitting operation which corresponds to the feedback message received from the UE 703 at operation 719. For example, if the feedback message received from the UE 703 includes NACK information, the BS 701 may perform a retransmitting operation. The retransmitting operation performed by the BS 701 will be described below, so a detailed description thereof will be omitted herein.

A process of transmitting and receiving a signal in an LTE communication system supporting an HARQ scheme according to an embodiment of the present disclosure has been described with reference to FIG. 7, and an example of a process of generating feedback information in a UE in an LTE communication system supporting an HARQ scheme according to an embodiment of the present disclosure will be described with reference to FIG. 8.

Figure 8:
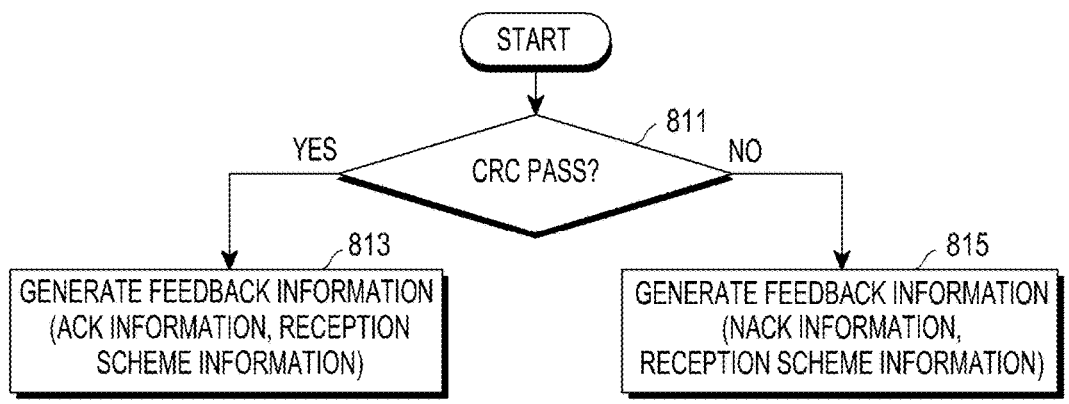
FIG. 8 illustrates an example of a process of generating feedback information in a UE in an LTE communication system supporting an HARQ scheme according to an embodiment of the present disclosure.

FIG. 8 illustrates an example of a process of generating feedback information in a UE in an LTE communication system supporting an HARQ scheme according to an embodiment of the present disclosure.

Referring to FIG. 8, it will be noted that a process of generating feedback information in a UE in FIG. 8 is a process of generating feedback information which is suitable for a distributed-radio access network (D-RAN) situation. Here, a D-RAN situation indicates a situation in which it is difficult for BSs to share information through a backhaul. Further, a process of generating feedback information in a UE in FIG. 8 is, for example, a process of generating feedback information which is suitable for a case that an HARQ retransmission scheme is a CC scheme or a partial IR scheme.

A UE determines whether a CRC result indicates CRC pass at operation 811. If the CRC result indicates the CRC pass, the UE proceeds to operation 813. The UE generates ACK information and reception scheme information as feedback information at operation 813.

If the CRC result does not indicate the CRC pass, that is, if the CRC result indicates CRC fail, the UE proceeds to operation 815. The UE generates NACK information and reception scheme information as feedback information at operation 815.

An example of a process of generating feedback information in a UE in an LTE communication system supporting an HARQ scheme according to an embodiment of the present disclosure has been described with reference to FIG. 8, and an example of a process of performing a transmitting operation which corresponds to a feedback message in a BS in an LTE communication system supporting an HARQ scheme according to an embodiment of the present disclosure will be described with reference to FIG. 9.

Figure 9:
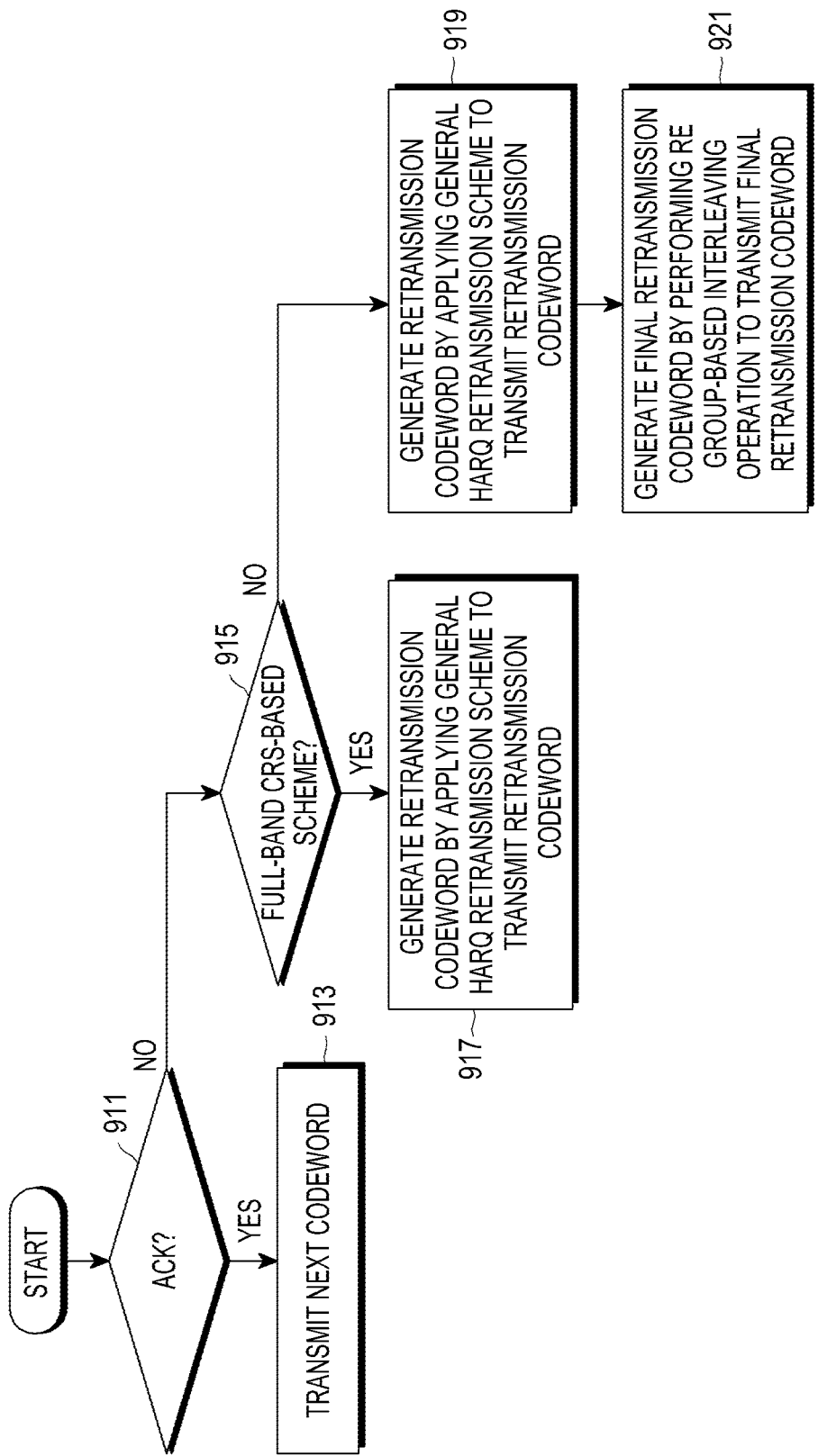
FIG. 9 illustrates an example of a process of performing a transmitting operation which corresponds to a feedback message in a BS in an LTE communication system supporting an HARQ scheme according to an embodiment of the present disclosure.

FIG. 9 illustrates an example of a process of performing a transmitting operation which corresponds to a feedback message in a BS in an LTE communication system supporting an HARQ scheme according to an embodiment of the present disclosure.

Referring to FIG. 9, it will be noted that a process of performing a transmitting operation which corresponds to a feedback message in a BS in FIG. 9 is a process of performing a retransmitting operation which is suitable for a D-RAN situation. Further, it will be noted that a process of performing a transmitting operation which corresponds to a feedback message in a BS in FIG. 9 is a process of performing a retransmitting operation which is suitable for a case that an HARQ retransmission scheme is a CC scheme or a partial IR scheme.

It will be noted that a process of performing a transmitting operation which corresponds to a feedback message in a BS in FIG. 9 is a process of performing a retransmitting operation in a case that a UE generates feedback information as described in FIG. 8.

The BS determines whether a feedback message received from a UE includes ACK information at operation 911. If the feedback message includes the ACK information, the BS proceeds to operation 913. The BS transmits the next codeword at operation 913.

If the feedback message does not include the ACK information, that is, if the feedback message includes NACK information, the BS proceeds to operation 915. The BS determines whether a reception scheme information included in the feedback message indicates a full-band CRS-based scheme at operation 915. If the reception scheme information indicates the full-band CRS-based scheme, the BS proceeds to operation 917. The BS generates a retransmission codeword by applying a general HARQ retransmission scheme to a previously transmitted codeword, and transmits the retransmission codeword to the UE at operation 917. For example, the HARQ retransmission scheme includes one of HARQ retransmission schemes, e.g., a CC scheme, an IR scheme, a partial IR scheme, and/or the like. A detailed description of the CC scheme, the IR scheme, and the partial IR scheme will be omitted herein.

If the reception scheme information is not the full-band CRS-based scheme, that is, if the reception scheme information is an RE grouping-based scheme, the BS proceeds to operation 919. The BS generates a retransmission codeword by applying the general HARQ retransmission scheme at operation 919, and proceeds to operation 921. The BS performs an RE group-based interleaving operation on the retransmission codeword to generate a final retransmission codeword, and transmits the final retransmission codeword to the UE at operation 921. The reason why the RE group-based interleaving operation is performed on the retransmission codeword is so that symbols transmitted in an RE group which is affected by a CRS interference signal may be transmitted in an RE group which is not affected by the CRS interference signal.

Although FIG. 9 illustrates an example of a process of performing a transmitting operation which corresponds to a feedback message in a BS in an LTE communication system supporting an HARQ scheme according to an embodiment of the present disclosure, various changes could be made to FIG. 9. For example, although shown as a series of operations, various operations in FIG. 9 could overlap, occur in parallel, occur in a different order, or occur multiple times.

An example of a process of performing a transmitting operation which corresponds to a feedback message in a BS in an LTE communication system supporting an HARQ scheme according to an embodiment of the present disclosure has been described with reference to FIG. 9, and another example of a process of generating feedback information in a UE in an LTE communication system supporting an HARQ scheme according to an embodiment of the present disclosure will be described with reference to FIG. 10.

Figure 10:
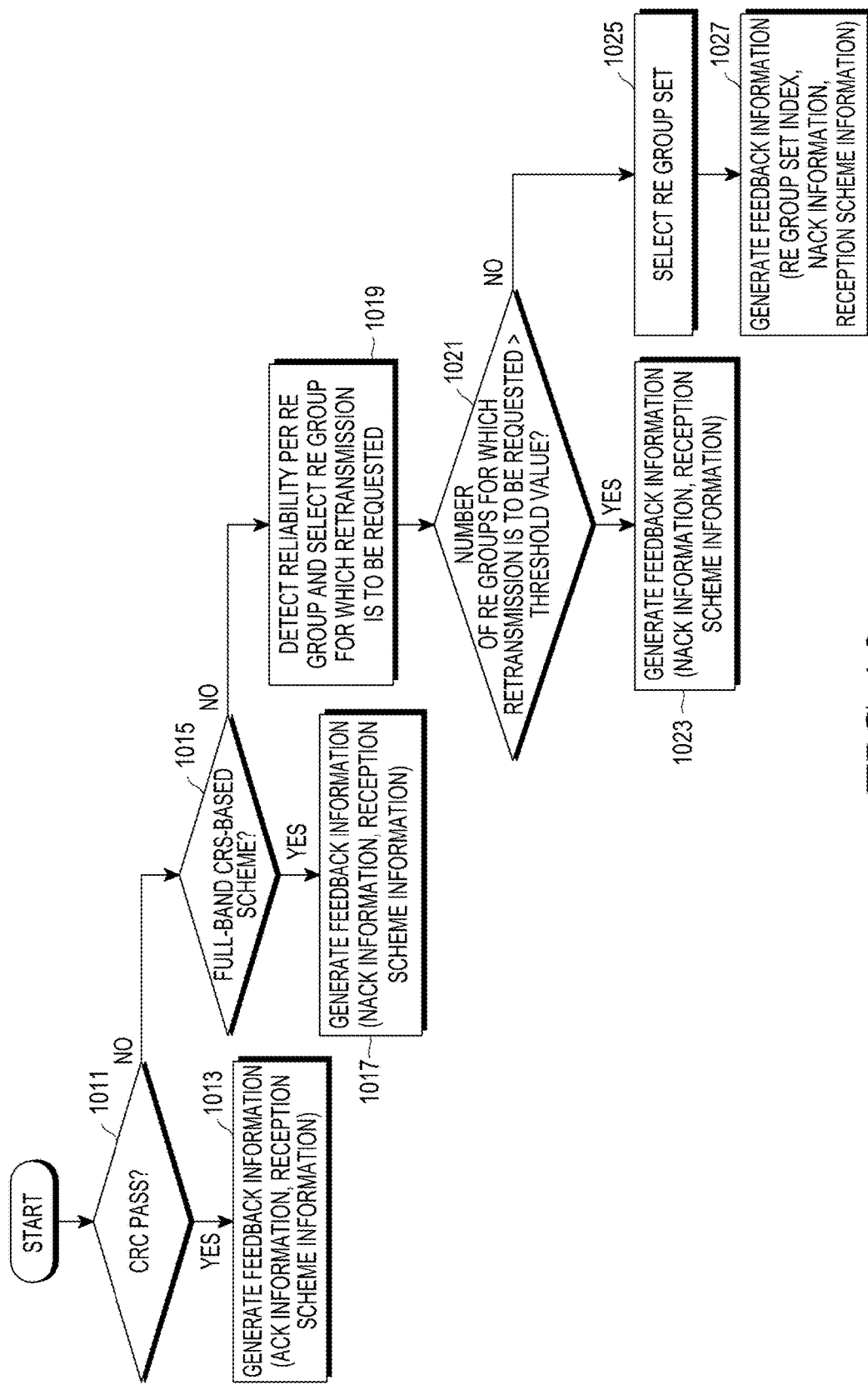
FIG. 10 illustrates another example of a process of generating feedback information in a UE in an LTE communication system supporting an HARQ scheme according to an embodiment of the present disclosure.

FIG. 10 illustrates another example of a process of generating feedback information in a UE in an LTE communication system supporting an HARQ scheme according to an embodiment of the present disclosure.

Referring to FIG. 10, it will be noted that a process of generating feedback information in a UE in FIG. 10 is a process of generating feedback information which is suitable for a D-RAN situation.

A UE determines whether a CRC result indicates CRC pass at operation 1011. If the CRC result indicates the CRC pass, the UE proceeds to operation 1013. The UE generates ACK information and reception scheme information as feedback information at operation 1013.

If the CRC result does not indicate the CRC pass, that is, if the CRC result indicates CRC fail, the UE proceeds to operation 1015. The UE determines whether a reception scheme of the UE is a full-band CRS-based scheme at operation 1015. If the reception scheme of the UE is the full-band CRS-based scheme, the UE proceeds to operation 1017. The UE generates NACK information and reception scheme information as feedback information at operation 1017.

If the reception scheme of the UE is not the full-band CRS-based scheme, that is, if the reception scheme of the UE is an RE grouping-based scheme, the UE proceeds to operation 1019. The UE detects a reliability per RE group, selects an RE group for which retransmission will be requested, and proceeds to operation 1021.

A scheme of detecting the reliability per RE group will be described below.

Firstly, a scheme of detecting a reliability per RE group based on an LLR will be described below.

A UE calculates an LLR per bit which correspond to an RE group. The UE detects an average of an absolute value of an LLR per RE group to use the average as a metric of the reliability per RE group. This may be expressed as Equation (7).

$$\text{Metric} = E[\,|\,LLR(y_k, \text{bit\_index})\,|\,] = \qquad \text{Equation (7)}$$

$$E\left[\left|\log\left(\frac{\sum_{x \in A^1_{bit\_index}} f(y_k \mid H_k, x)}{\sum_{x \in A^0_{bit\_index}} f(y_k \mid H_k, x)}\right)\right|\right]$$

In Equation (7), Metric denotes a metric of a reliability per RE group, E denotes a function of detecting an average, $y_k$ denotes a received signal for the kth symbol, bit_index denotes a bit index, $H_k$ denotes a fading channel coefficient for the kth symbol, A denotes a total constellation set, $x \in A^1_{bit\_index}$ denotes a set including symbols of which corresponding bit indexes are 1 among total symbols, $x \in A^0_{bit\_index}$ denotes a set including symbols of which corresponding bit indexes are 0 among the total symbols, and $f(y_k|H_k,x)$ denotes a function which has $y_k$, $H_k$, and x as input parameters.

Secondly, a scheme of detecting a reliability per RE group based on a symbol transition probability will be described below.

A UE calculates a symbol transition probability for a candidate transmission symbol per RE included in an RE group. The UE detects a maximum symbol transition probability per RE, and averages the detected maximum symbol transition probabilities per RE group to use the average as a metric of a reliability per RE group.

This may be expressed as Equation (8).

$$\text{Metric} = E[|\max_{x \in A}(f(y_k|H_k,x))|] \qquad \text{Equation (8)}$$

In Equation (8), Metric denotes a metric of a reliability per RE group, E denotes a function of detecting an average, max denotes a function of detecting a maximum value, $y_k$ denotes a received signal for the kth symbol, $H_k$ denotes a fading channel coefficient for the kth symbol, A denotes a total constellation set, and $f(y_k|H_k, x)$ denotes a function which has $y_k$, $H_k$, and x as input parameters.

Thirdly, a scheme of detecting a reliability per RE group based on an Euclidean distance will be described below.

A UE calculates an Euclidean distance for a candidate transmission symbol per RE included in an RE group. The UE detects a maximum Euclidean distance per RE. The UE averages the detected maximum Euclidean distances per RE group to use the average as a metric of the reliability per RE group. This may be expressed as Equation (9).

$$\text{Metric} = E[|\max_{x \in A}(|y_k - H_k x|^2)|] \qquad \text{Equation (9)}$$

In Equation (9), Metric denotes a metric of a reliability per RE group, E denotes a function of detecting an average, max denotes a function of detecting a maximum value, $y_k$ denotes a received signal for the kth symbol, $H_k$ denotes a fading channel coefficient for the kth symbol, A denotes a total constellation set, and $f(y_k|H_k,x)$ denotes a function which has $y_k$, $H_k$, and x as input parameters.

Meanwhile, there may be various schemes of determining an RE group for which retransmission will be requested in a UE, and these will be described below.

In the first scheme, if a metric of a corresponding RE group reliability is less than a preset threshold metric, a UE may determine the corresponding RE group as an RE group for which retransmission will be requested.

In the second scheme, a UE sets an average, a median, and/or the like of metrics of reliabilities of RE groups as a threshold metric. If a metric of a corresponding RE group reliability is less than the threshold metric, the UE may determine the corresponding RE group as an RE group for which retransmission will be requested.

In the third scheme, a UE may determine priorities for RE groups based on metrics of RE group reliabilities, and determine RE groups for which retransmission will be requested corresponding to a preset number.

Meanwhile, the UE determines whether the number of RE groups for which the retransmission will be requested is greater than a threshold value at operation 1021. The threshold value may be determined suitable for a system situation of the LTE mobile communication system, and a detailed description of this will be omitted herein. If the number of RE groups for which the retransmission will be requested is greater than the threshold value, the UE proceeds to operation 1023. The UE generates NACK information and reception scheme information as feedback information at operation 1023.

If the number of RE groups for which the retransmission will be requested is less than or equal to the threshold value, the UE proceeds to operation 1025. The UE selects an RE group set in which the maximum number of RE groups for which the retransmission will be requested are included, and proceeds to operation 1027. The RE group set may be generated based on various parameters, and a detailed description of this will be omitted herein. The UE generates an RE group set index of the selected RE group set, NACK information, and reception scheme information as feedback information at operation 1027.

Although FIG. 10 illustrates another example of a process of generating feedback information in a UE in an LTE communication system supporting an HARQ scheme according to an embodiment of the present disclosure, various changes could be made to FIG. 10. For example, although shown as a series of operations, various operations in FIG. 10 could overlap, occur in parallel, occur in a different order, or occur multiple times.

Another example of a process of generating feedback information in a UE in an LTE communication system supporting an HARQ scheme according to an embodiment of the present disclosure has been described with reference to FIG. 10, and another example of a process of performing a transmitting operation which corresponds to a feedback message in a BS in an LTE communication system supporting an HARQ scheme according to an embodiment of the present disclosure will be described with reference to FIG. 11.

Figure 11:
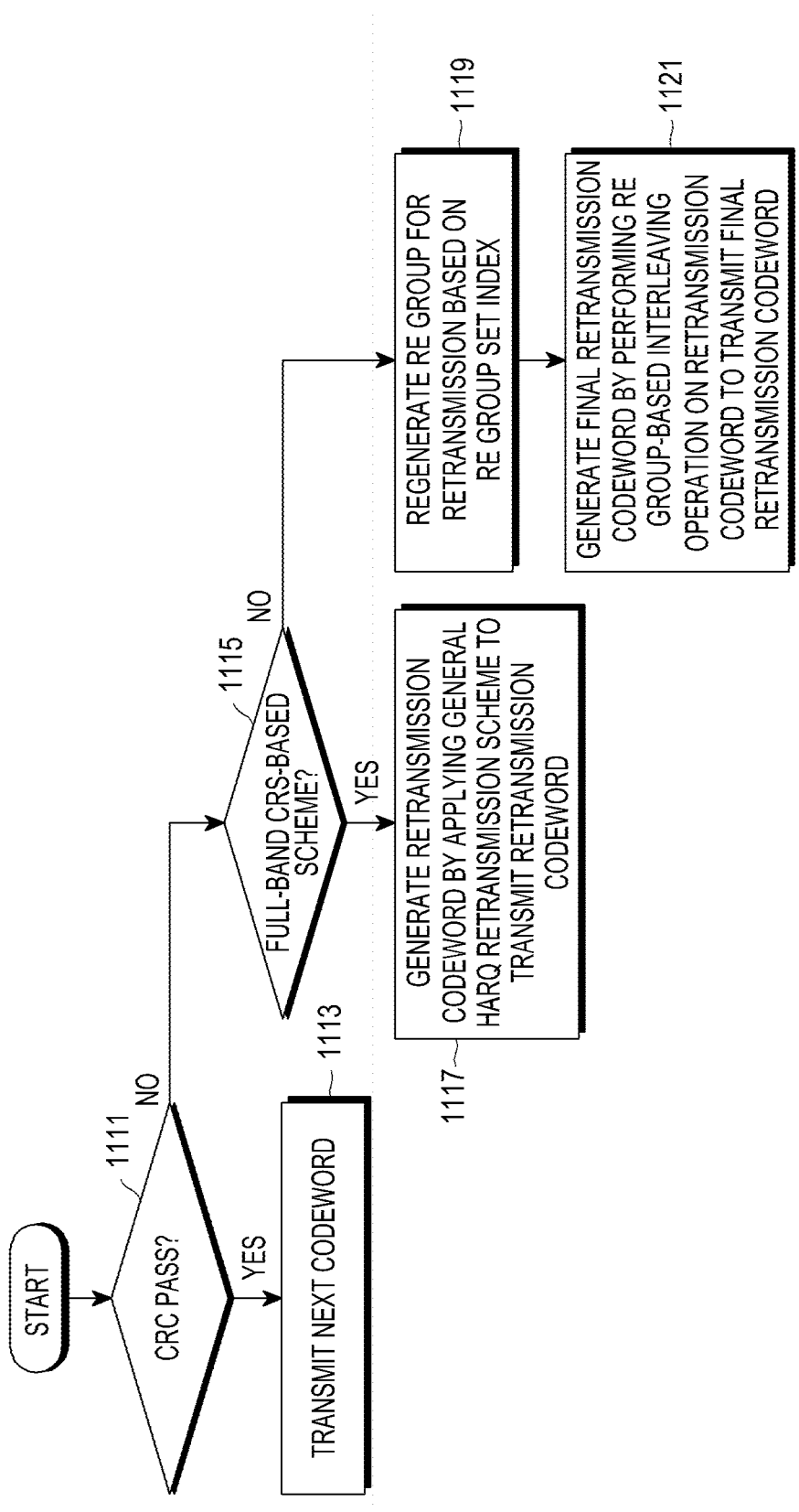
FIG. 11 illustrates another example of a process of performing a transmitting operation which corresponds to a feedback message in a BS in an LTE communication system supporting an HARQ scheme according to an embodiment of the present disclosure.

FIG. 11 illustrates another example of a process of performing a transmitting operation which corresponds to a feedback message in a BS in an LTE communication system supporting an HARQ scheme according to an embodiment of the present disclosure.

Referring to FIG. 11, it will be noted that a process of performing a transmitting operation which corresponds to a feedback message in a BS in FIG. 11 is a process of performing a retransmitting operation which is suitable for a D-RAN situation.

It will be noted that a process of performing a transmitting operation which corresponds to a feedback message in a BS in FIG. 11 is a process of performing a retransmitting operation in a case that a UE generates feedback information as described in FIG. 10.

The BS determines whether a feedback message received from a UE includes ACK information at operation 1111. If the feedback message includes the ACK information, the BS proceeds to operation 1113. The BS transmits the next codeword at operation 1113.

If the feedback message does not include the ACK information, that is, if the feedback message includes NACK information, the BS proceeds to operation 1115. The BS determines whether a reception scheme information included in the feedback message indicates a full-band CRS-based scheme at operation 1115. If the reception scheme information indicates the full-band CRS-based scheme, the BS proceeds to operation 1117. The BS generates a retransmission codeword by applying a general HARQ retransmission scheme to a previously transmitted codeword, and transmits the retransmission codeword to the UE at operation 1117. For example, the HARQ retransmission scheme includes one of HARQ retransmission schemes, e.g., a CC scheme, an IR scheme, a partial IR scheme, and/or the like.

If the reception scheme information does not indicate the full-band CRS-based scheme, that is, if the reception scheme information indicates an RE grouping-based scheme, the BS proceeds to operation 1119. The BS generates an RE group through which the BS will transmit a retransmission codeword based on an RE group set index included in the feedback message at operation 1119, and proceeds to operation 1121. The BS generates a final retransmission codeword by performing an RE group-based interleaving operation on the retransmission codeword, and transmits the final retransmission codeword to the UE at operation 1121. The reason why the RE group-based interleaving operation is performed on the retransmission codeword is so that symbols transmitted in an RE group which is affected by a CRS interference signal may be transmitted in an RE group which is not affected by the CRS interference signal.

Although FIG. 11 illustrates another example of a process of performing a transmitting operation which corresponds to a feedback message in a BS in an LTE communication system supporting an HARQ scheme according to an embodiment of the present disclosure, various changes could be made to FIG. 11. For example, although shown as a series of operations, various operations in FIG. 11 could overlap, occur in parallel, occur in a different order, or occur multiple times.

Another example of a process of performing a transmitting operation which corresponds to a feedback message in a BS in an LTE communication system supporting an HARQ scheme according to an embodiment of the present disclosure has been described with reference to FIG. 11, and still another example of a process of generating feedback information in a UE in an LTE communication system supporting an HARQ scheme according to an embodiment of the present disclosure will be described with reference to FIG. 12.

Figure 12:
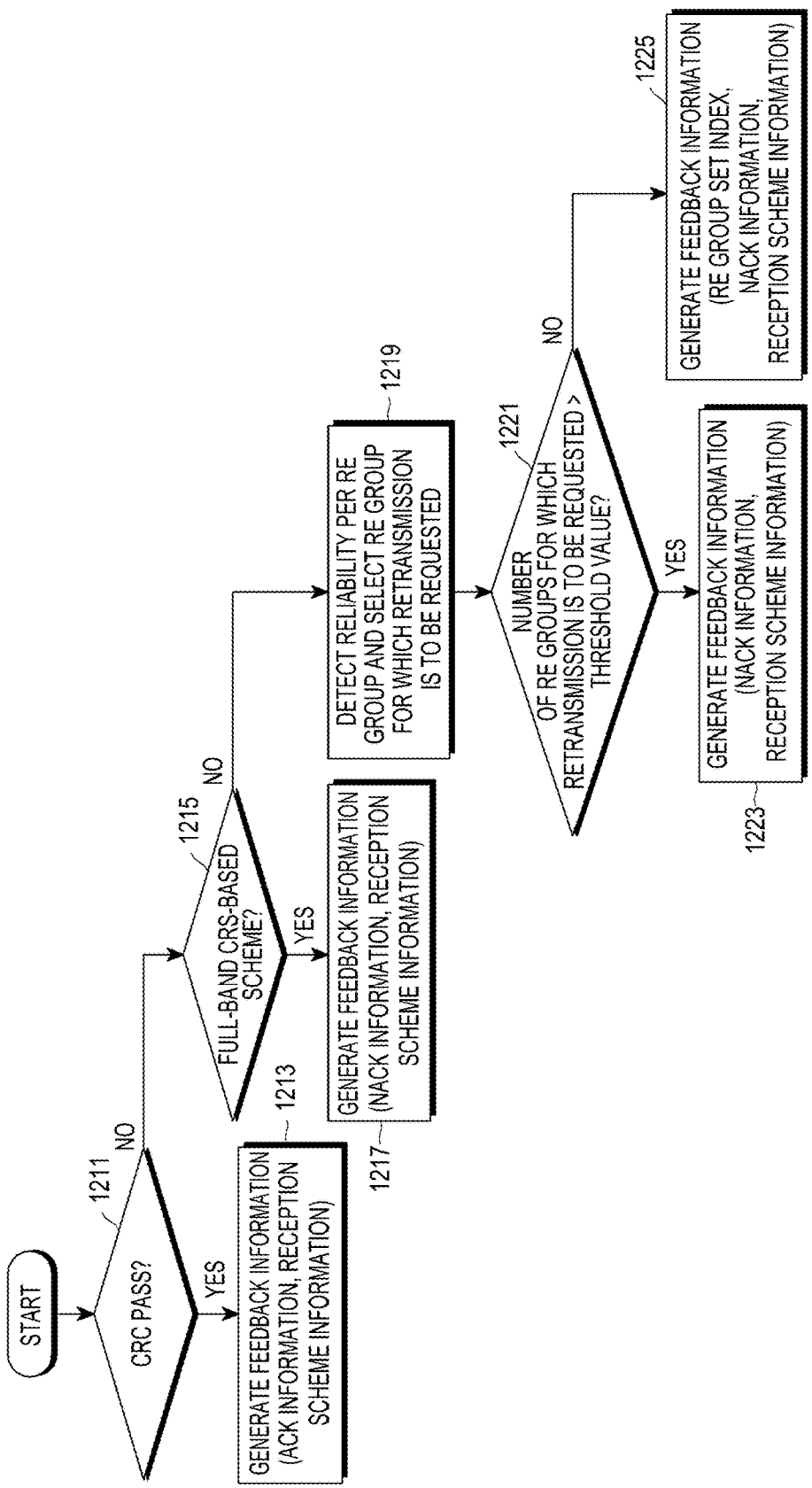
FIG. 12 illustrates still another example of a process of generating feedback information in a UE in an LTE communication system supporting an HARQ scheme according to an embodiment of the present disclosure.

FIG. 12 illustrates still another example of a process of generating feedback information in a UE in an LTE communication system supporting an HARQ scheme according to an embodiment of the present disclosure.

Referring to FIG. 12, it will be noted that a process of generating feedback information in a UE in FIG. 12 is a process of generating feedback information which is suitable for a D-RAN situation.

A UE determines whether a CRC result indicates CRC pass at operation 1211. If the CRC result indicates the CRC pass, the UE proceeds to at operation 1213. The UE generates ACK information and reception scheme information as feedback information at operation 1213.

If the CRC result does not indicate the CRC pass, that is, if the CRC result indicates CRC fail, the UE proceeds to operation 1215. The UE determines whether a reception scheme of the UE is a full-band CRS-based scheme at operation 1215. If the reception scheme of the UE is the full-band CRS-based scheme, the UE proceeds to operation 1217. The UE generates NACK information and reception scheme information as feedback information at operation 1217.

If the reception scheme of the UE is not the full-band CRS-based scheme, that is, if the reception scheme of the UE is an RE grouping-based scheme, the UE proceeds to operation 1219. The UE detects reliability per RE group, selects an RE group for which retransmission will be requested, and proceeds to operation 1221. An operation of the reliability per RE group and an operation of selecting the RE group for which retransmission will be requested have been described in FIG. 10, so a detailed description thereof will be omitted herein.

The UE determines whether the number of RE groups for which retransmission will be requested is greater than a preset threshold value at operation 1221. The threshold value may be determined suitable for a system situation of the LTE mobile communication system, and a detailed description of this will be omitted herein. If the number of RE groups for which the retransmission will be requested is greater than the threshold value, the UE proceeds to operation 1223. The UE generates NACK information and reception scheme information as feedback information at operation 1223.

If the number of RE groups for which the retransmission will be requested is less than or equal to the threshold value, the UE proceeds to operation 1225. The UE generates an RE group index of the selected RE group, NACK information, and reception scheme information as feedback information at operation 1225.

Although FIG. 12 illustrates still another example of a process of generating feedback information in a UE in an LTE communication system supporting an HARQ scheme according to an embodiment of the present disclosure, various changes could be made to FIG. 12. For example, although shown as a series of operations, various operations in FIG. 12 could overlap, occur in parallel, occur in a different order, or occur multiple times.

Still another example of a process of generating feedback information in a UE in an LTE communication system supporting an HARQ scheme according to an embodiment of the present disclosure has been described with reference to FIG. 12, and still another example of a process of performing a transmitting operation which corresponds to a feedback message in a BS in an LTE communication system supporting an HARQ scheme according to an embodiment of the present disclosure will be described with reference to FIG. 13.

Figure 13:
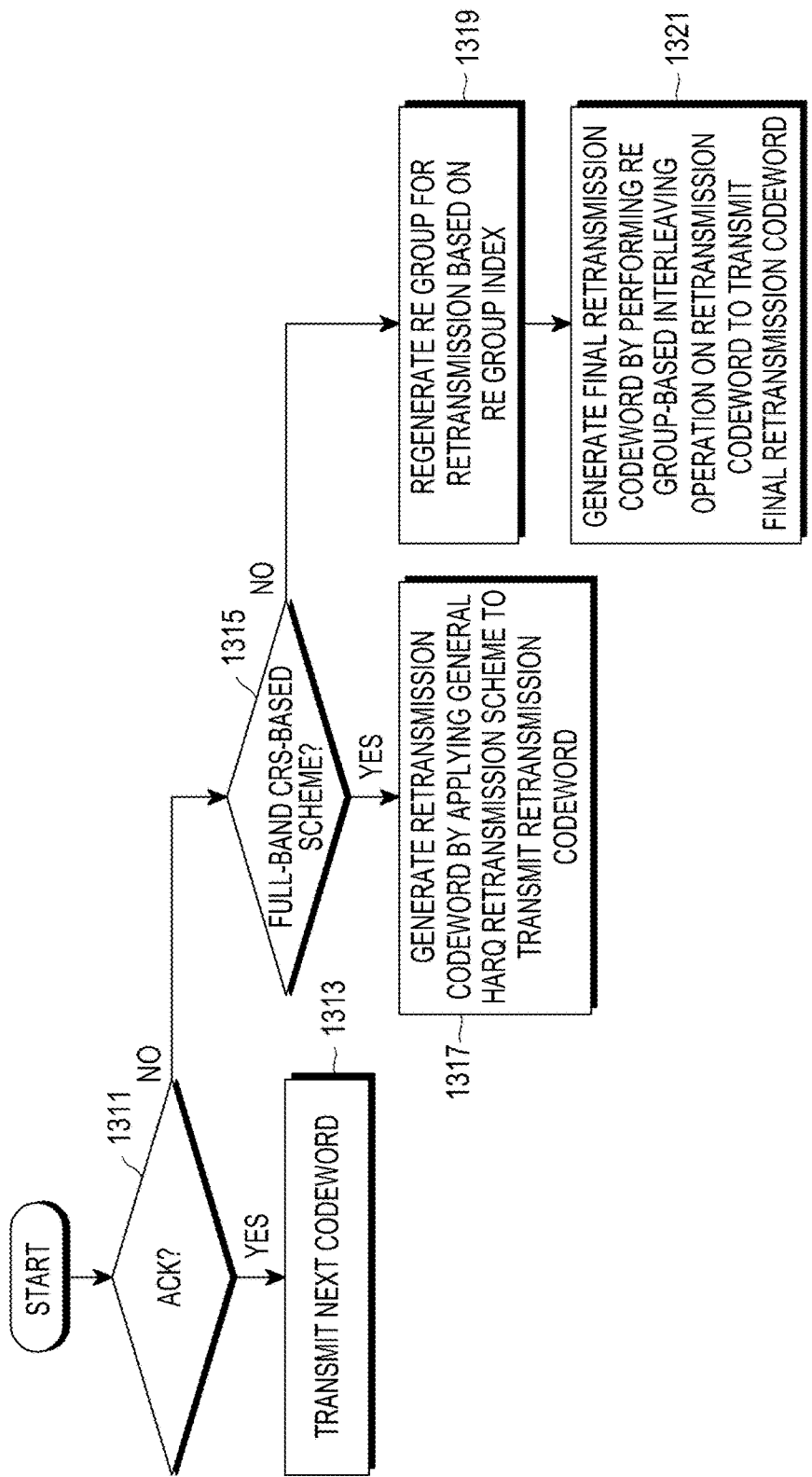
FIG. 13 illustrates still another example of a process of performing a transmitting operation which corresponds to a feedback message in a BS in an LTE communication system supporting an HARQ scheme according to an embodiment of the present disclosure.

FIG. 13 illustrates still another example of a process of performing a transmitting operation which corresponds to a feedback message in a BS in an LTE communication system supporting an HARQ scheme according to an embodiment of the present disclosure.

Referring to FIG. 13, it will be noted that a process of performing a transmitting operation which corresponds to a feedback message in a BS in FIG. 13 is a process of performing a retransmitting operation which is suitable for a D-RAN situation.

It will be noted that a process of performing a transmitting operation which corresponds to a feedback message in a BS in FIG. 13 is a process of performing a retransmitting operation in a case that a UE generates feedback information as described in FIG. 12.

The BS determines whether a feedback message received from a UE includes ACK information at operation 1311. If the feedback message includes the ACK information, the BS proceeds to operation 1313. The BS transmits the next codeword at operation 1313.

If the feedback message does not include the ACK information, that is, if the feedback message includes NACK information, the BS proceeds to operation 1315. The BS determines whether a reception scheme information included in the feedback message indicates a full-band CRS-based scheme at operation 1315. If the reception scheme information indicates the full-band CRS-based scheme, the BS proceeds to operation 1317. The BS generates a retransmission codeword by applying a general HARQ retransmission scheme to a previously transmitted codeword, and transmits the retransmission codeword to the UE at operation 1317. For example, the HARQ retransmission scheme includes one of HARQ retransmission schemes, e.g., a CC scheme, an IR scheme, a partial IR scheme, and/or the like.

If the reception scheme information does not indicate the full-band CRS-based scheme, that is, if the reception scheme information indicates an RE grouping-based scheme, the BS proceeds to operation 1319. The BS generates an RE group through which the BS will transmit a retransmission codeword based on an RE group index included in the feedback message at operation 1319, and proceeds to operation 1321. The BS generates a final retransmission codeword by performing an RE group-based interleaving operation on the retransmission codeword, and transmits the final retransmission codeword to the UE at operation 1321. The reason why the RE group-based interleaving operation is performed on the retransmission codeword is so that symbols transmitted in an RE group which is affected by a CRS interference signal may be transmitted in an RE group which is not affected by the CRS interference signal.

Although FIG. 13 illustrates still another example of a process of performing a transmitting operation which corresponds to a feedback message in a BS in an LTE communication system supporting an HARQ scheme according to an embodiment of the present disclosure, various changes could be made to FIG. 13. For example, although shown as a series of operations, various operations in FIG. 13 could overlap, occur in parallel, occur in a different order, or occur multiple times.

Still another example of a process of performing a transmitting operation which corresponds to a feedback message in a BS in an LTE communication system supporting an HARQ scheme according to an embodiment of the present disclosure has been described with reference to FIG. 13, and still another example of a process of generating feedback information in a UE in an LTE communication system supporting an HARQ scheme according to an embodiment of the present disclosure will be described with reference to FIG. 14.

Figure 14:
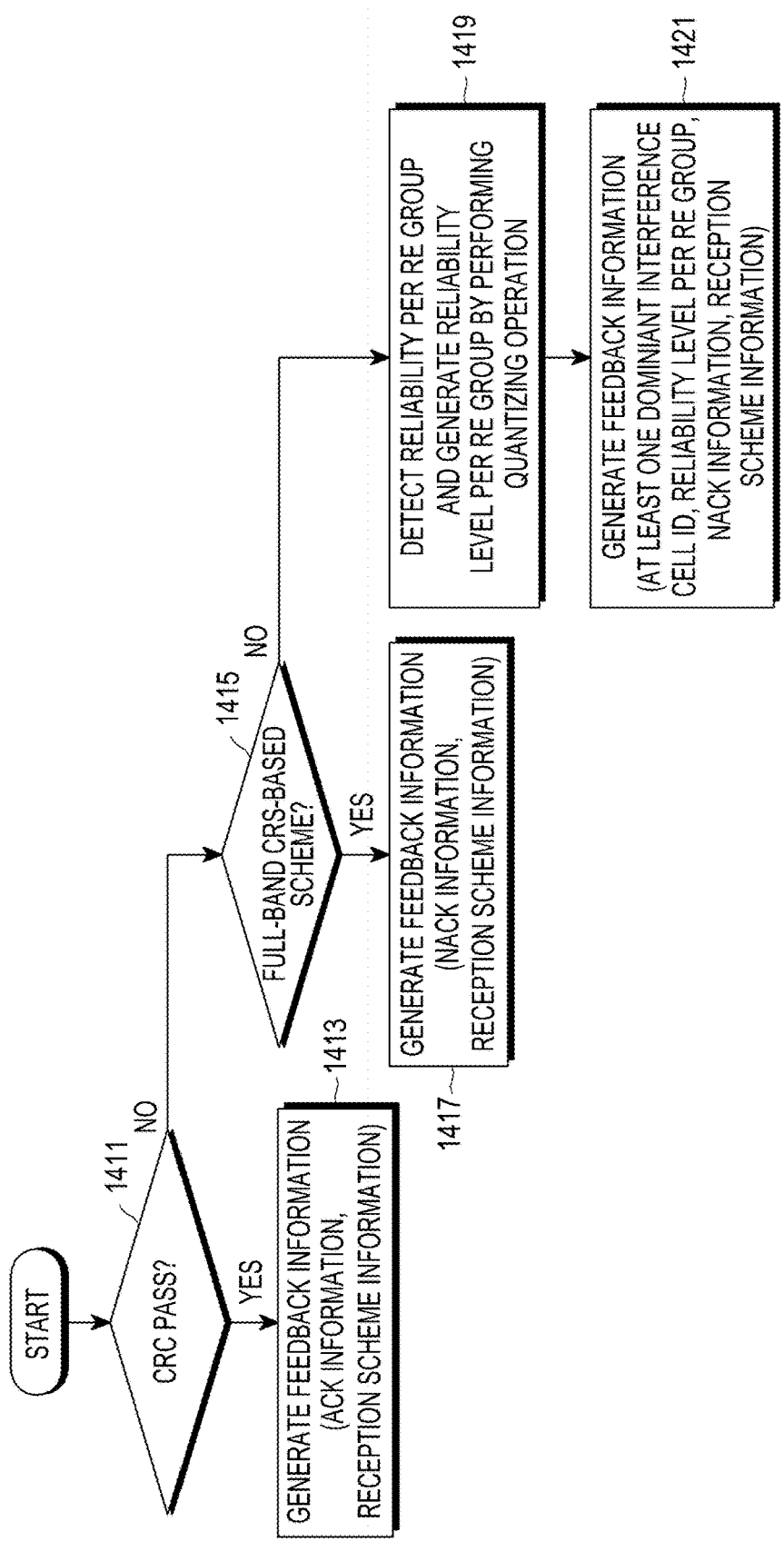
FIG. 14 illustrates still another example of a process of generating feedback information in a UE in an LTE communication system supporting an HARQ scheme according to an embodiment of the present disclosure.

FIG. 14 illustrates still another example of a process of generating feedback information in a UE in an LTE communication system supporting an HARQ scheme according to an embodiment of the present disclosure.

Referring to FIG. 14, it will be noted that a process of generating feedback information in a UE in FIG. 14 is a process of generating feedback information which is suitable for a partial centralized-RAN (partial C-RAN) situation. Here, a partial C-RAN situation denotes a situation in which some neighbor BSs are capable of sharing information through a backhaul. Further, it will be noted that a process of generating feedback information in a UE in FIG. 14 is a process of generating feedback information which is suitable for a centralized-RAN (C-RAN).

A UE determines whether a CRC result indicates CRC pass at operation 1411. If the CRC result is the CRC pass, the UE proceeds to at operation 1413. The UE generates ACK information and reception scheme information as feedback information at operation 1413.

If the CRC result does not indicate the CRC pass, that is, if the CRC result indicates CRC fail, the UE proceeds to operation 1415. The UE determines whether a reception scheme of the UE is a full-band CRS-based scheme at operation 1415. If the reception scheme of the UE is the full-band CRS-based scheme, the UE proceeds to operation 1417. The UE generates NACK information and reception scheme information as feedback information at operation 1417.

If the reception scheme of the UE is not the full-band CRS-based scheme, that is, if the reception scheme of the UE is an RE grouping-based scheme, the UE proceeds to operation 1419. The UE detects a reliability per RE group, generates a reliability level per RE group by performing a quantizing operation on the detected reliability level per RE group, and proceeds to operation 1421. A scheme of detecting a reliability per RE group has been described in Equations (7) to (9), so a detailed description thereof will be omitted herein. Further, a quantizing operation for a reliability per RE group denotes an operation of quantizing the reliability per RE group with a preset number of levels based on a reliability per RE group determined as Equations (7) to (9). More detailed description of the operation of determining the reliability level per RE group by performing the quantizing operation on the reliability per RE group will be omitted herein.

The UE generates at least one dominant interference cell ID, a reliability level per RE level, NACK information, and reception scheme information as feedback information at operation 1421.

Although FIG. 14 illustrates still another example of a process of generating feedback information in a UE in an LTE communication system supporting an HARQ scheme according to an embodiment of the present disclosure, various changes could be made to FIG. 14. For example, although shown as a series of operations, various operations in FIG. 14 could overlap, occur in parallel, occur in a different order, or occur multiple times.

Still another example of a process of generating feedback information in a UE in an LTE communication system supporting an HARQ scheme according to an embodiment of the present disclosure has been described with reference to FIG. 14, and still another example of a process of performing a transmitting operation which corresponds to a feedback message in a BS in an LTE communication system supporting an HARQ scheme according to an embodiment of the present disclosure will be described with reference to FIGS. 15A and 15B.

Figure 15A:
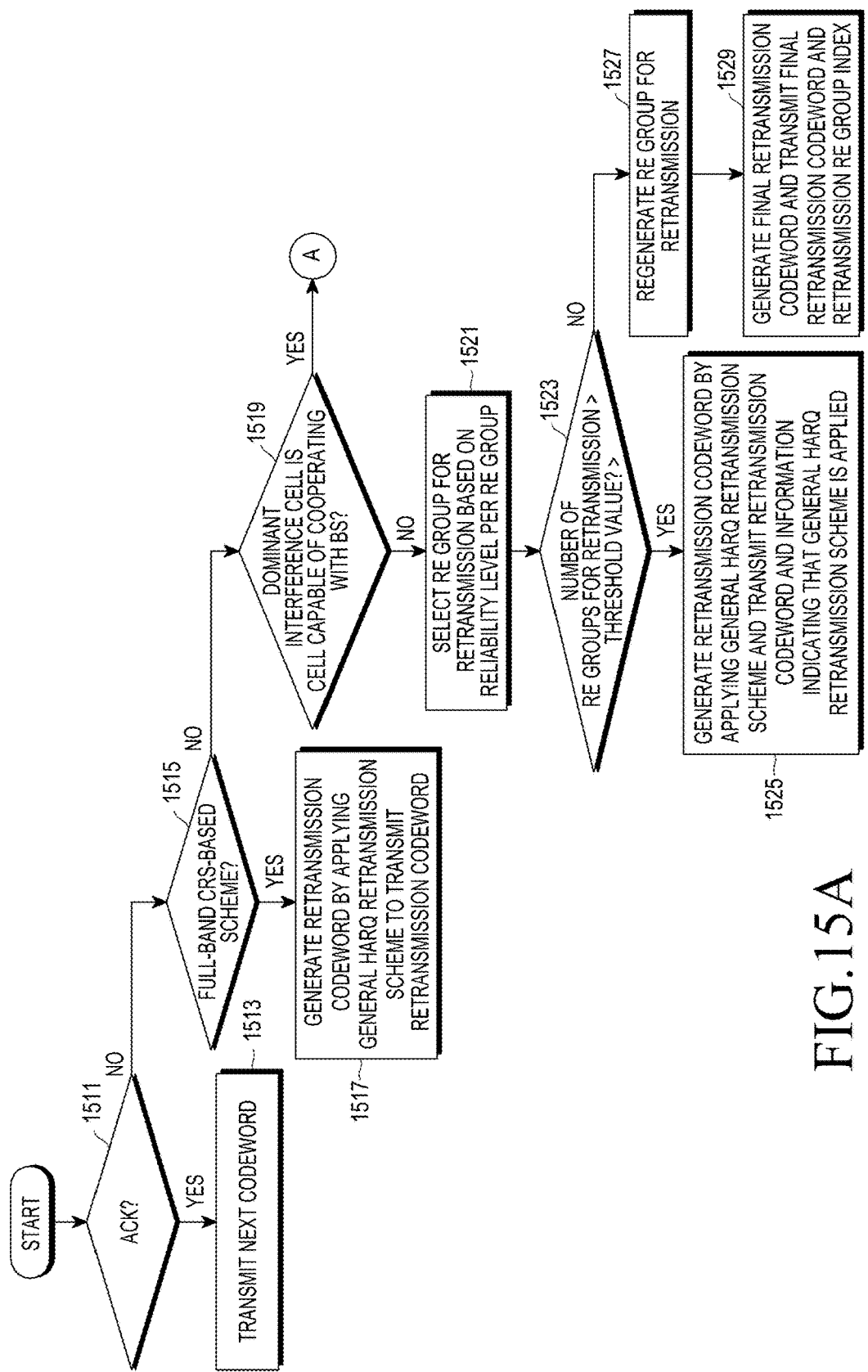
FIGS. 15A and 15B illustrate still another example of a process of performing a transmitting operation which corresponds to a feedback message in a BS in an LTE communication system supporting an HARQ scheme according to an embodiment of the present disclosure.
Figure 15B:
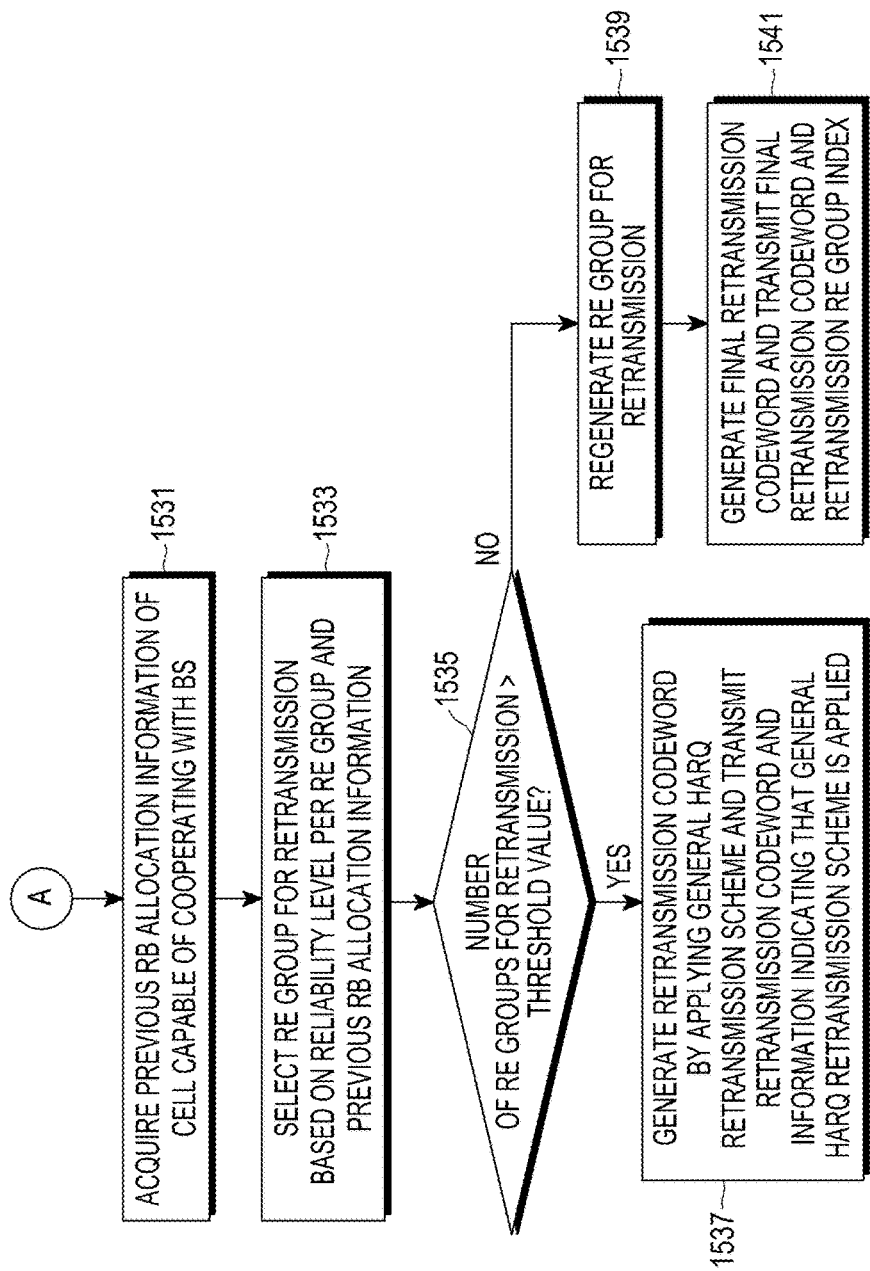

FIGS. 15A and 15B illustrate still another example of a process of performing a transmitting operation which corresponds to a feedback message in a BS in an LTE communication system supporting an HARQ scheme according to an embodiment of the present disclosure.

Referring to FIGS. 15A and 15B, it will be noted that a process of performing a transmitting operation which corresponds to a feedback message in a BS in FIGS. 15A and 15B is a process of performing a retransmitting operation which is suitable for a partial C-RAN situation.

It will be noted that a process of performing a transmitting operation which corresponds to a feedback message in a BS in FIGS. 15A and 15B is a process of performing a retransmitting operation in a case that a UE generates feedback information as described in FIG. 14.

The BS determines whether a feedback message received from a UE includes ACK information at operation 1511. If the feedback message includes the ACK information, the BS proceeds to operation 1513. The BS transmits the next codeword at operation 1513.

If the feedback message does not include the ACK information, that is, if the feedback message includes NACK information, the BS proceeds to operation 1515. The BS determines whether a reception scheme information included in the feedback message indicates a full-band CRS-based scheme at operation 1515. If the reception scheme information indicates the full-band CRS-based scheme, the BS proceeds to operation 1517. The BS generates a retransmission codeword by applying a general HARQ retransmission scheme to a previously transmitted codeword, and transmits the retransmission codeword to the UE at operation 1517. For example, the HARQ retransmission scheme includes one of HARQ retransmission schemes, e.g., a CC scheme, an IR scheme, a partial IR scheme, and/or the like.

If the reception scheme information does not indicate the full-band CRS-based scheme, that is, if the reception scheme information indicates an RE grouping-based scheme, the BS proceeds to operation 1519. The BS determines whether a cell which corresponds to at least one dominant interference cell ID included in the feedback message, i.e., a dominant interference cell is a cell which is capable of cooperating with the BS at operation 1519. If the dominant interference cell is not the cell which is capable of cooperating with the BS, the BS proceeds to operation 1521. The BS generates an RE group for retransmission based on a reliability level per RE group included in the feedback message at operation 1521, and proceeds to operation 1523. An operation of selecting the RE group for the retransmission based on the reliability level per RE group in the BS is the same as an operation of selecting an RE group for transmission based on a reliability level per RE group in a UE at operation 1019 in FIG. 10, and a detailed description thereof will be omitted herein. The BS determines whether the number of the RE groups for retransmission is greater than a preset threshold value at operation 1523. Here, the threshold value may be determined suitable for a system situation of the LTE mobile communication system, and a detailed description of this will be omitted herein. If the number of the RE groups for the retransmission is greater than the preset threshold value, the BS proceeds to operation 1525.

The BS generates a retransmission codeword by applying a general HARQ retransmission scheme to a previously transmitted codeword, and transmits the retransmission codeword to the UE at operation 1525. For example, the HARQ retransmission scheme includes one of HARQ retransmission schemes, e.g., a CC scheme, an IR scheme, a partial JR scheme, and/or the like. The BS transmits information indicating that the general HARQ retransmission scheme has been applied to the UE along with the retransmission codeword at operation 1525.

If the number of the RE groups for the retransmission is not greater than the threshold value, that is, if the number of the RE groups for the retransmission is less than or equal to the threshold value, the BS proceeds to operation 1527. The BS regenerates an RE group through which the BS will transmit a retransmission codeword at operation 1527, and proceeds to operation 1529. The BS generates a final retransmission codeword by performing an RE group-based interleaving operation on the retransmission codeword, and transmits the final retransmission codeword to the UE at operation 1529. The reason why the RE group-based interleaving operation is performed on the retransmission codeword is so that symbols transmitted in an RE group which is affected by a CRS interference signal may be transmitted in an RE group which is not affected by the CRS interference signal. The BS transmits a retransmission RE group index along with the final retransmission codeword to the UE at operation 1529. The retransmission RE group index denotes an RE group index of an RE group through which the final retransmission codeword is transmitted.

If the dominant interference cell is the cell which is capable of cooperating with the BS, the BS proceeds to operation 1531. The BS acquires previous RB allocation information of a cell with which the BS may cooperate through a backhaul at operation 1531, and the BS proceeds to operation 1533. The BS selects an RE group for retransmission based on the reliability level per RE group included in the feedback message received from the UE and previous RB allocation information of the cell with which the BS may cooperate which is acquired through the backhaul at operation 1533, and the BS proceeds to operation 1535. An example of an operation of selecting the RE group for the retransmission based on the reliability level per RE group included in the feedback message received from the UE and the previous RB allocation information of the cell with which the BS may cooperate which is acquired through the backhaul may be expressed as Table 1.

TABLE 1

| Data RE (backhaul) | RE group reliability (feedback) | Whether to retransmit |
|---|---|---|
| Collision occurs | High | Retransmission is performed or not performed (settable) |
| | Medium | Retransmission is performed |
| | Low | Retransmission is performed |
| Collision does not occur | High | Retransmission is not performed |
| | Medium | Retransmission is performed (RE group interleaving) |
| | Low | Retransmission is performed (RE group interleaving) |

Meanwhile, the BS determines whether the number of RE groups for retransmission is greater than the threshold value at operation 1535. If the number of RE groups for the retransmission is greater than the threshold value, the BS proceeds to operation 1537.

The BS generates a retransmission codeword by applying a general HARQ retransmission scheme to a previously transmitted codeword, and transmits the retransmission codeword to the UE at operation 1537. The BS transmits information indicating that the general HARQ retransmission scheme has been applied to the UE along with the retransmission codeword at operation 1537.

If the number of RE groups for the retransmission is not greater than the threshold value, that is, if the number of RE groups for the retransmission is less than or equal to the threshold value, the BS proceeds to operation 1539. The BS regenerates an RE group through which a retransmission codeword will be transmitted at operation 1539, and proceeds to operation 1541. The BS performs an RE group-based interleaving operation on the retransmission codeword to generate a final retransmission codeword, and transmits the final retransmission codeword to the UE at operation 1541. The reason why the RE group-based interleaving operation is performed on the retransmission codeword is so that symbols transmitted in an RE group which is affected by a CRS interference signal may be transmitted in an RE group which is not affected by the CRS interference signal. The BS transmits a retransmission RE group index along with the final retransmission codeword to the UE at operation 1541. Here, the retransmission RE group index denotes an RE group index of an RE group through which the final retransmission codeword is transmitted.

Although FIGS. 15A and 15B illustrate still another example of a process of performing a transmitting operation which corresponds to a feedback message in a BS in an LTE communication system supporting an HARQ scheme according to an embodiment of the present disclosure, various changes could be made to FIGS. 15A and 15B. For example, although shown as a series of operations, various operations in FIGS. 15A and 15B could overlap, occur in parallel, occur in a different order, or occur multiple times.

Still another example of a process of performing a transmitting operation which corresponds to a feedback message in a BS in an LTE communication system supporting an HARQ scheme according to an embodiment of the present disclosure has been described with reference to FIGS. 15A and 15B, and still another example of a process of performing a transmitting operation which corresponds to a feedback message in a BS in an LTE communication system supporting an HARQ scheme according to an embodiment of the present disclosure will be described with reference to FIGS. 16A and 16B.

Figure 16A:
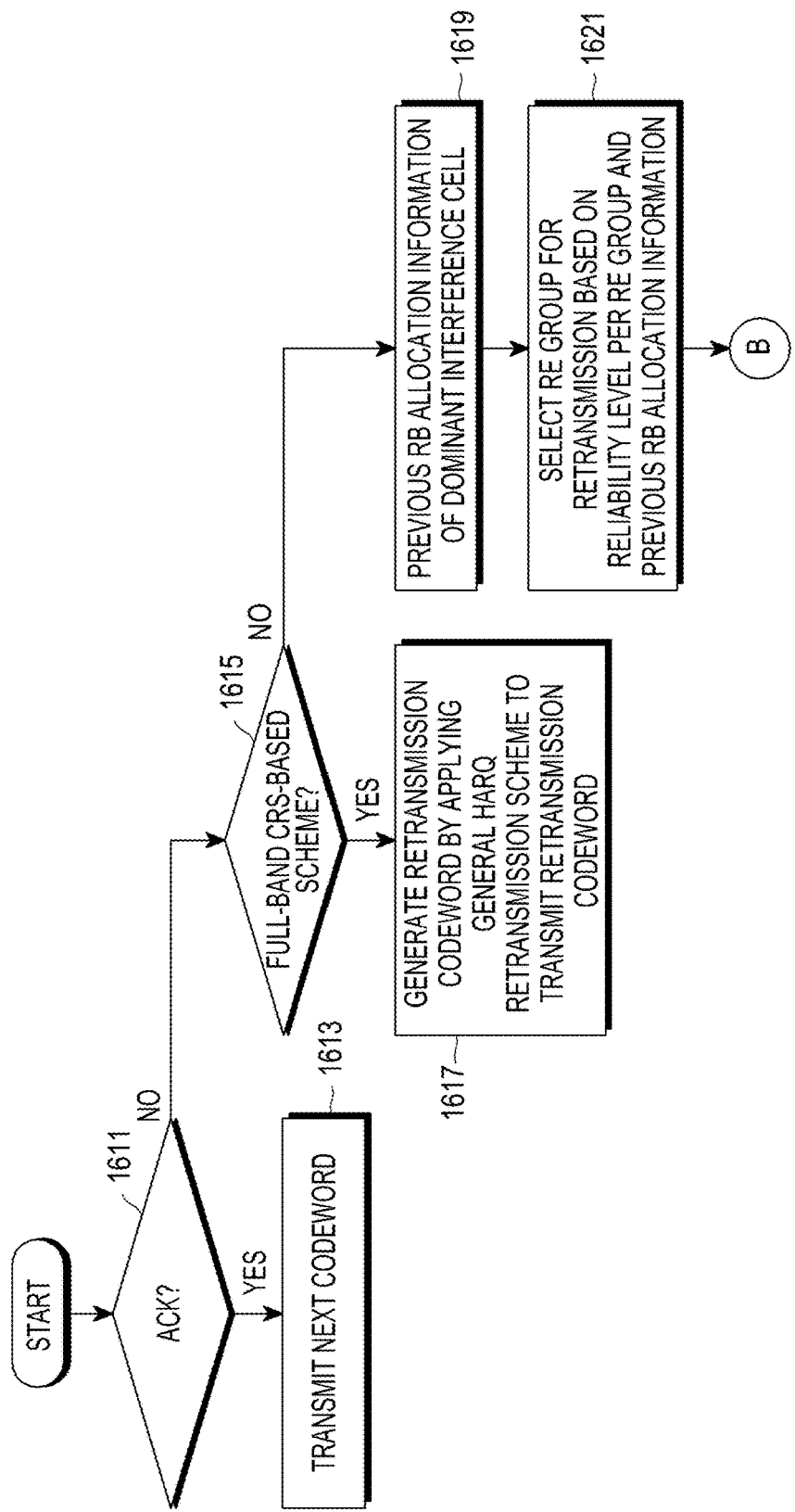
FIGS. 16A and 16B illustrate still another example of a process of performing a transmitting operation which corresponds to a feedback message in a BS in an LTE communication system supporting an HARQ scheme according to an embodiment of the present disclosure.
Figure 16B:
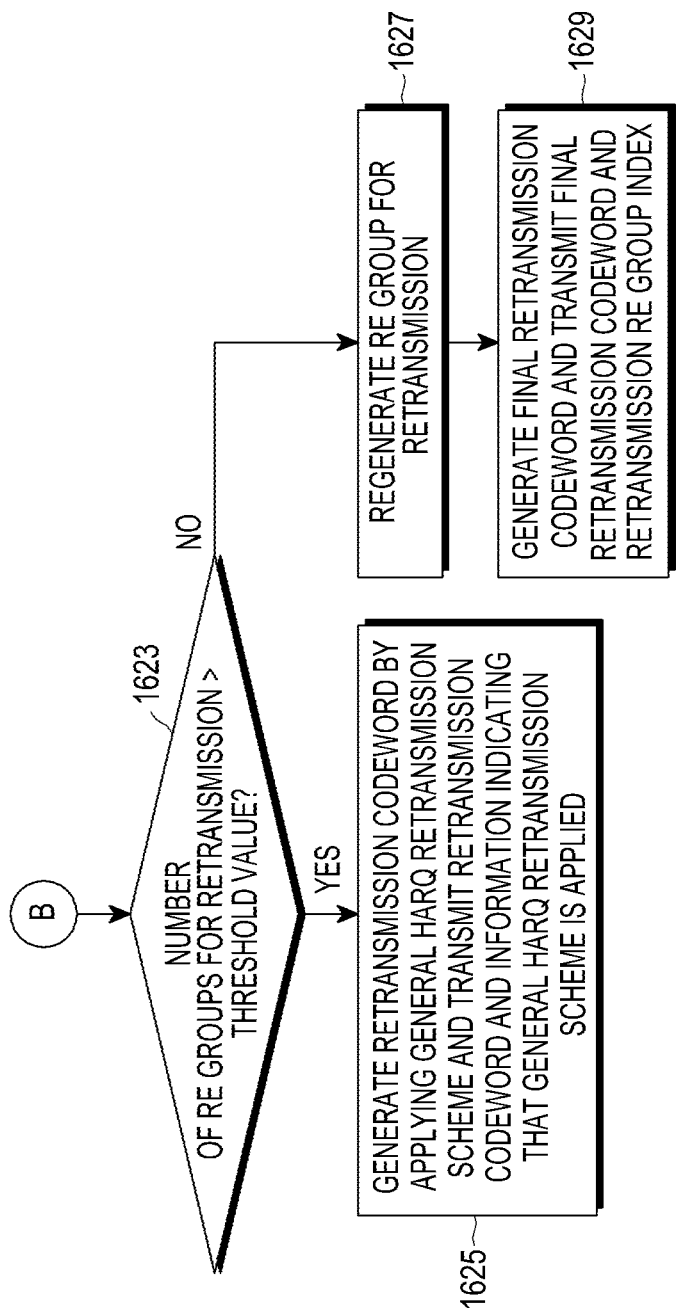

FIGS. 16A and 16B illustrate still another example of a process of performing a transmitting operation which corresponds to a feedback message in a BS in an LTE communication system supporting an HARQ scheme according to an embodiment of the present disclosure.

Referring to FIGS. 16A and 16B, it will be noted that a process of performing a transmitting operation which corresponds to a feedback message in a BS in FIGS. 16A and 16B is a process of performing a retransmitting operation which is suitable for a C-RAN situation.

It will be noted that a process of performing a transmitting operation which corresponds to a feedback message in a BS in FIGS. 16A and 16B is a process of performing a retransmitting operation in a case that a UE generates feedback information as described in FIG. 14.

The BS determines whether a feedback message received from a UE includes ACK information at operation 1611. If the feedback message includes the ACK information, the BS proceeds to operation 1613. The BS transmits the next codeword at operation 1613.

If the feedback message does not include the ACK information, that is, if the feedback message includes NACK information, the BS proceeds to operation 1615. The BS determines whether a reception scheme information included in the feedback message indicates a full-band CRS-based scheme at operation 1615. If the reception scheme information indicates the full-band CRS-based scheme, the BS proceeds to operation 1617. The BS generates a retransmission codeword by applying a general HARQ retransmission scheme to a previously transmitted codeword, and transmits the retransmission codeword to the UE at operation 1617. For example, the HARQ retransmission scheme includes one of HARQ retransmission schemes, e.g., a CC scheme, an IR scheme, a partial IR scheme, and/or the like.

If the reception scheme information does not indicate the full-band CRS-based scheme, that is, if the reception scheme information indicates an RE grouping-based scheme, the BS proceeds to operation 1619. The BS acquires previous RB allocation information of a dominant cell through a backhaul, and proceeds to operation 1621. The BS selects an RE group for retransmission based on the reliability level per RE group included in the feedback message received from the UE and the previous RB allocation information of the dominant cell which is acquired through the backhaul at operation 1521, and proceeds to operation 1623.

An example of an operation of selecting the RE group for the retransmission based on the reliability level per RE group included in the feedback message received from the UE and the previous RB allocation information of the dominant cell which is acquired through the backhaul may be expressed as Table 2.

TABLE 2

| Data RE (backhaul) | RE group reliability (feedback) | Whether to retransmit |
|---|---|---|
| Collision occurs | High | Retransmission is performed or not performed (settable) |
| | Medium | Retransmission is performed |
| | Low | Retransmission is performed |
| Collision does not occur | High | Retransmission is not performed |
| | Medium | Retransmission is performed (RE group interleaving) |
| | Low | Retransmission is performed (RE group interleaving) |

Meanwhile, the BS determines whether the number of RE groups for the retransmission is greater than the threshold value at operation 1623. If the number of RE groups for the retransmission is greater than the threshold value, the BS proceeds to operation 1625.

The BS generates a retransmission codeword by applying a general HARQ retransmission scheme to a previously transmitted codeword, and transmits the retransmission codeword to the UE at operation 1625. The BS transmits information indicating that the general HARQ retransmission scheme has been applied to the UE along with the retransmission codeword at operation 1625.

If the number of RE groups for the retransmission is not greater than the threshold value, that is, if the number of RE groups for the retransmission is less than or equal to the threshold value, the BS proceeds to operation 1627. The BS regenerates an RE group through which a retransmission codeword will be transmitted at operation 1627, and proceeds to operation 1629. The BS performs an RE group-based interleaving operation on the retransmission codeword to generate a final retransmission codeword, and transmits the final retransmission codeword to the UE at operation 1629. The reason why the RE group-based interleaving operation is performed on the retransmission codeword is so that symbols transmitted in an RE group which is affected by a CRS interference signal may be transmitted in an RE group which is not affected by the CRS interference signal. The BS transmits a retransmission RE group index along with the final retransmission codeword to the UE at operation 1629. Here, the retransmission RE group index denotes an RE group index of an RE group through which the final retransmission codeword is transmitted.

Still another example of a process of performing a transmitting operation which corresponds to a feedback message in a BS in an LTE communication system supporting an HARQ scheme according to an embodiment of the present disclosure has been described with reference to FIGS. 16A and 16B, and an example of an inner structure of a UE in an LTE communication system supporting an HARQ scheme according to an embodiment of the present disclosure will be described with reference to FIG. 17.

Figure 17:
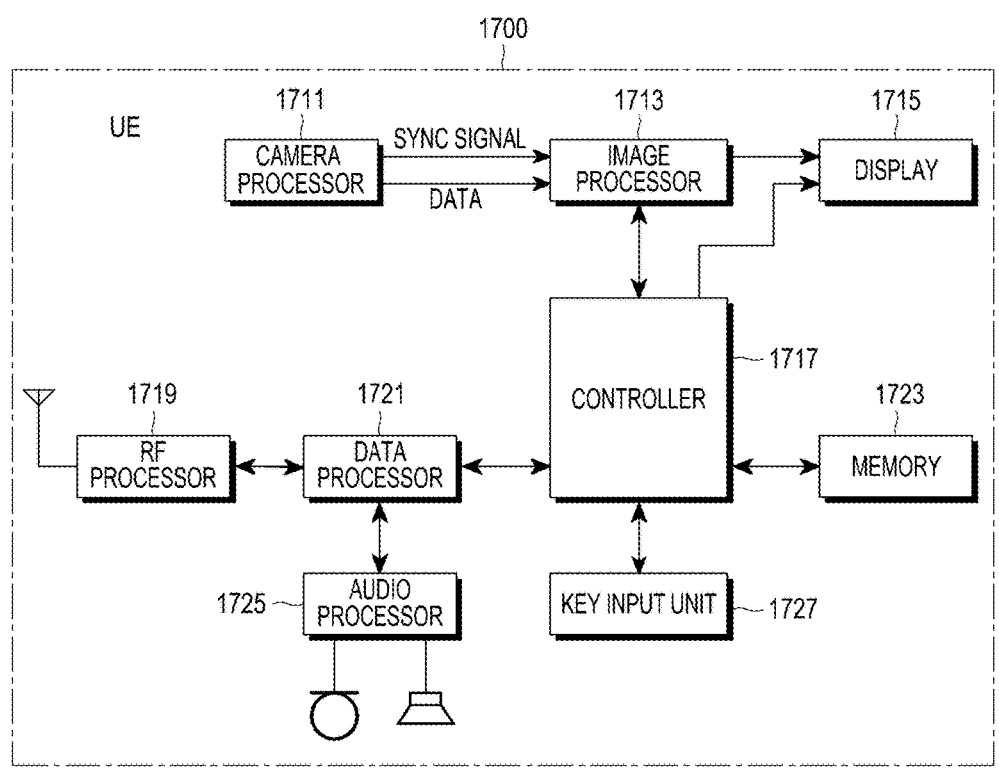
FIG. 17 illustrates an example of an inner structure of a UE in an LTE mobile communication system supporting an HARQ scheme according to an embodiment of the present disclosure.

FIG. 17 illustrates an example of an inner structure of a UE in an LTE mobile communication system supporting an HARQ scheme according to an embodiment of the present disclosure.

Referring to FIG. 17, a UE 1700 may be connected with an external electronic device (not illustrated in FIG. 17) using at least one of a communication module, a connector, and an earphone connecting jack. The electronic device may include one of various devices which are removable from the UE 1700 and are connectible with the UE 1700 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a WiFi Direct communication device, a wireless AP, etc. The UE 1700 may be connected with a server or another communication device such as, for example, one of a cellular phone, a smart phone, a tablet PC, a desktop PC, and a server, in a wired or wireless manner.

The UE 1700 includes a camera processor 1711, an image processor 1713, a display 1715, a controller 1717, a radio frequency (RF) processor 1719, a data processor 1721, a memory 1723, an audio processor 1725, and a key input unit 1727.

The RF processor 1719 is responsible for radio communication of the UE 1700. The RF processor 1719 includes a RF transmitter for frequency up-converting transmission signals and amplifying the up-converted signals, and a RF receiver for low-noise-amplifying received signals and frequency down-converting the amplified signals.

The data processor 1721 includes a transmitter for encoding and modulating the transmission signals, and a receiver for demodulating and decoding the received signals. In other words, the data processor 1721 may include a modulator/de-modulator (MODEM) and a coder/decoder (CODEC). The CODEC includes a data CODEC for processing packet data, and an audio CODEC for processing audio signals such as voice.

The audio processor 1725 plays received audio signals output from the audio CODEC in the data processor 1721 using a speaker, and transfers transmission audio signals picked up by a microphone to the audio CODEC in the data processor 1721.

The key input unit 1727 includes numeric/character keys for inputting numeric and character information and function keys for setting various functions.

A memory 1723 may include a program memory, a data memory, and the like. The program memory may store programs for controlling the general operation of the UE 1700. In accordance with an embodiment to the present disclosure, the program memory may store programs related to an operation of transmitting and receiving a signal in a wireless communication system supporting an HARQ scheme, e.g., an operation of generating feedback information, transmitting the generated feedback information to a BS, and receiving a codeword from the BS based on the feedback information. The data memory may temporarily store the data generated during execution of these programs.

The memory 1723 may be implemented as an arbitrary data storing device such as a read only memory (ROM), a random access memory (RAM), and a memory card (for example, a secure digital (SD) card, and a memory stick).

The memory 1723 may include a non-volatile memory, a volatile memory, a hard disk drive (HDD), or a solid state drive (SSD).

The memory 1723 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the UE 1700, and images captured by the camera processor 1711.

The memory 1723 is a media which is red though a machine, e.g., a computer. Here, the term "machine-readable medium" includes a medium for providing data to the machine to allow the machine to execute a particular function. The memory 1723 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc read-only memory (CD-ROM), an optical disk, a punch card, a paper tape, a RAM, a programmable read-only memory (PROM), an erasable programmable read-only memory (EPROM), and a flash-EPROM.

The controller 1717 controls the overall operation of the UE 1700. The controller 1717 performs an operation related to an operation of transmitting and receiving a signal in a wireless communication system supporting an HARQ scheme, e.g., an operation of generating feedback information, transmitting the generated feedback information to a BS, and receiving a codeword from the BS based on the feedback information. The operation related to the operation of transmitting and receiving the signal is performed in the manner described before with reference to FIG. 5 to FIGS. 16A and 16B, so a detailed description thereof will be omitted herein.

A camera processor 1711 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 1713 performs image signal processing (ISP) for displaying the image signals output from the camera processor 1711 on the display 1715. The ISP may include gamma correction, interpolation, spatial variations, image effects, image scaling, automatic white balance (AWB), automatic exposure (AE), and automatic focus (AF). The image processor 1713 processes the image signals output from the camera processor 1711 on a frame-by-frame basis, and outputs the frame image data according to the characteristics and size of the display 1715.

The image processor 1713 includes a video codec, which compresses the frame image data displayed on the display 1715 by a preset coding scheme, and decompresses the compressed frame image data into the original frame image data. The video codec may include a joint photographic experts group (JPEG) codec, a moving picture experts group 4 (MPEG4) codec, and a Wavelet codec. The image processor 1713 is assumed to have an on-screen display (OSD) function, and may output OSD data according to the size of the displayed screen, under control of the controller 1717.

The display 1715 displays, on its screen, image signals output from the image processor 1713 and user data output from the controller 1717. The display 1715 may include a liquid crystal display (LCD). In this case, the display 1715 may include an LCD controller, a memory capable of storing image data, and an LCD panel. When implemented in a touch screen manner, the LCD may serve as an input unit. In this case, the same keys as those on the key input unit 1727 may be displayed on the display 1715.

If the display 1715 is implemented as the touch screen, the display 1715 outputs an analog signal, which corresponds to at least one input to a user graphic interface, to the controller 1717.

The display 1715 receives at least one user inputs through a user's body (for example, a finger including a thumb) or the key input unit 1727 (for example, a stylus pen or an electronic pen).

The display 1715 receives continuous motions on one touch (for example, a drag). The display 1715 outputs an analog signal corresponding to the continuous motions to the controller 1717.

In an embodiment of the present disclosure, a touch may also include a non-contact touch (for example, when the user input means is positioned within a distance of, for example, 1 cm) in which the user input means may be detected without a direct contact with the display 1715. The touch may also include a direct contact between the display 1715 and a finger or the key input unit 1727. A distance or interval from the display 1715 within which the user input means may be detected may be changed according to the capability or structure of the UE 1700. In particular, to separately detect a direct touch event based on a contact with the user input means and an indirect touch event (that is, a hovering event), the display 1715 may be configured to output different values for values (for example, an analog voltage value or current value) detected in the direct touch event and the hovering event.

The display 1715 may be implemented as, for example, a resistive type, a capacitive type, an infrared type, an acoustic wave type, or a combination thereof.

The display 1715 may include at least two touch panels capable of sensing a touch, an approach of a finger, or the key input unit 1727 to receive inputs generated by the finger or the key input unit 1727. The at least two touch panels provide different output values to the controller 1717. Thus, the controller 1717 differently recognizes the values input from the at least two touch screen panels to identify whether the input from the display 1715 is the input generated by the finger or by the key input unit 1727.

The controller 1717 converts the analog signal received from the display 1715 into a digital signal and controls the display 1715 using the digital signal. For example, the controller 1717 may control a shortcut icon (not illustrated in FIG. 17) displayed on the display 1715 to be selected or executed in response to a direct touch event or a hovering event.

The controller 1717, by detecting a value (for example, an electric-current value) output through the display 1715, recognizes a hovering interval or distance as well as a user input position and converts the recognized distance into a digital signal (for example, a Z coordinate). The controller 1717 may also, by detecting the value output through the display 1715, detect a pressure applied by the user input means to the display 1715, and convert the detected pressure into a digital signal.

While the camera processor 1711, the image processor 1713, the display 1715, the controller 1717, the RF processor 1719, the data processor 1721, the memory 1723, the audio processor 1725, and the key input unit 1727 are shown in FIG. 17 as separate units, it is to be understood that this is for merely convenience of description. In other words, two or more of the camera processor 1711, the image processor 1713, the display 1715, the controller 1717, the RF processor 1719, the data processor 1721, the memory 1723, the audio processor 1725, and the key input unit 1727 may be incorporated into a single unit.

Alternatively, the 1700 may be implemented with one processor.

An example of an inner structure of a UE in an LTE mobile communication system supporting an HARQ scheme according to an embodiment of the present disclosure has been described with reference to FIG. 17, and another example of an inner structure of a UE in an LTE mobile communication system supporting an HARQ scheme according to an embodiment of the present disclosure will be described with reference to FIG. 18.

Figure 18:
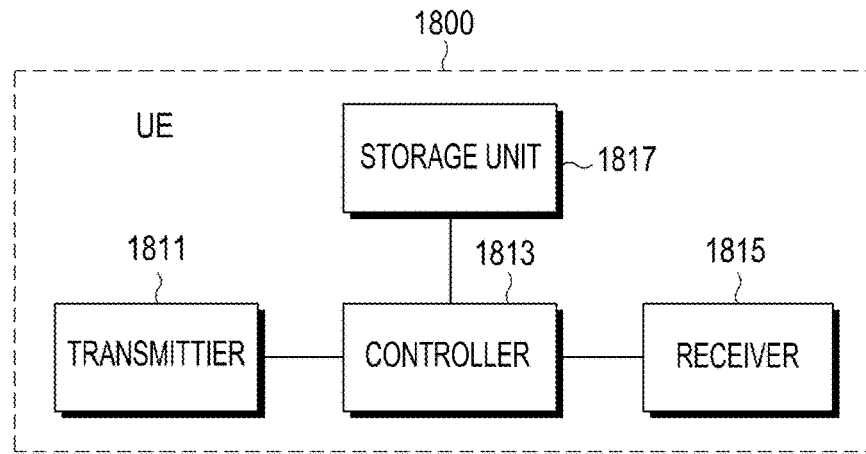
FIG. 18 illustrates another example of an inner structure of a UE in an LTE mobile communication system supporting an HARQ scheme according to an embodiment of the present disclosure.

FIG. 18 illustrates another example of an inner structure of a UE in an LTE mobile communication system supporting an HARQ scheme according to an embodiment of the present disclosure.

Referring to FIG. 18, a UE 1800 includes a transmitter 1811, a controller 1813, a receiver 1815, and a storage unit 1817.

The controller 1813 controls the overall operation of the UE 1800. More particularly, the controller 1813 controls an operation related to an operation of transmitting and receiving a signal in a wireless communication system supporting an HARQ scheme, e.g., an operation of generating feedback information, transmitting the generated feedback information to a BS, and receiving a codeword from the BS based on the feedback information. The operation related to the operation of transmitting and receiving the signal in the wireless communication system supporting the HARQ scheme, e.g., the operation of generating the feedback information, transmitting the generated feedback information to the BS, and receiving the codeword from the BS based on the feedback information has been described with reference to FIG. 5 to FIGS. 16A and 16B and a detailed description thereof will be omitted herein.

The transmitter 1811 transmits various signals and various messages to other devices, e.g., a BS, and/or the like included in the LTE mobile communication system under a control of the controller 1813. The various signals and various messages transmitted in the transmitter 1811 have been described with reference to FIG. 5 to FIGS. 16A and 16B and a detailed description thereof will be omitted herein.

The receiver 1815 receives various signals and various messages from other devices, e.g., a BS, and/or the like included in the LTE mobile communication system under a control of the controller 1813. The various signals and various messages received in the receiver 1815 have been described with reference to FIG. 5 to FIGS. 16A and 16B and a detailed description thereof will be omitted herein.

The storage unit 1817 stores various programs, various data, and the like related to an operation related to an operation of transmitting and receiving a signal in a wireless communication system supporting an HARQ scheme, e.g., an operation of generating feedback information, transmitting the generated feedback information to a BS, and receiving a codeword from the BS based on the feedback information performed by the UE 1800 under a control of the controller 1813.

The storage unit 1817 stores various signals and various messages which are received by the receiver 1815 from the other devices, e.g., the BS and/or the like.

While the transmitter 1811, the controller 1813, the receiver 1815, and the storage unit 1817 are described in the UE 1800 as separate units, it is to be understood that this is merely for convenience of description. In other words, two or more of the transmitter 1811, the controller 1813, the receiver 1815, and the storage unit 1817 may be incorporated into a single unit.

The UE 1800 may be implemented with one processor.

Another example of an inner structure of a UE in an LTE mobile communication system supporting an HARQ scheme according to an embodiment of the present disclosure has been described with reference to FIG. 18, and an example of an inner structure of a BS in an LTE mobile communication system supporting an HARQ scheme according to an embodiment of the present disclosure will be described with reference to FIG. 19.

Figure 19:
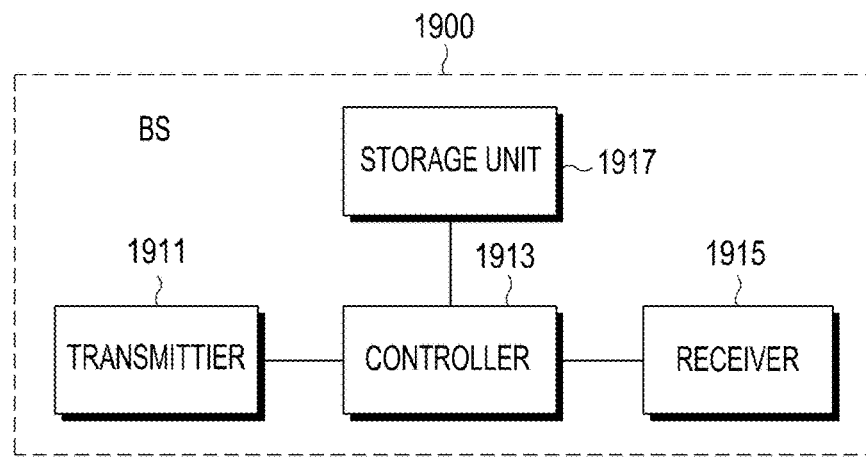
FIG. 19 illustrates an example of an inner structure of a BS in an LTE mobile communication system supporting an HARQ scheme according to an embodiment of the present disclosure.

FIG. 19 illustrates an example of an inner structure of a BS in an LTE mobile communication system supporting an HARQ scheme according to an embodiment of the present disclosure.

Referring to FIG. 19, a BS 1900 includes a transmitter 1911, a controller 1913, a receiver 1915, and a storage unit 1917.

The controller 1913 controls the overall operation of the BS 1900. More particularly, the controller 1913 controls an operation related to an operation of transmitting and receiving a signal in a wireless communication system supporting an HARQ scheme, e.g., an operation of transmitting a codeword to a UE, receiving feedback information from the UE, and transmitting a codeword to the UE based on the feedback information. The operation related to the operation of transmitting and receiving the signal in the wireless communication system supporting the HARQ scheme, e.g., the operation of transmitting the codeword to the UE, receiving the feedback information from the UE, and transmitting the codeword to the UE based on the feedback information has been described with reference to FIG. 5 to FIGS. 16A and 16B and a detailed description thereof will be omitted herein.

The transmitter 1911 transmits various signals and various messages to other devices, e.g., a UE, and/or the like included in the LTE mobile communication system under a control of the controller 1913. The various signals and various messages transmitted in the transmitter 1911 have been described with reference to FIG. 5 to FIGS. 16A and 16B and a detailed description thereof will be omitted herein.

The receiver 1915 receives various signals and various messages from other devices, e.g., a UE, and/or the like included in the LTE mobile communication system under a control of the controller 1913. The various signals and various messages received in the receiver 1915 have been described with reference to FIG. 5 to FIGS. 16A and 16B and a detailed description thereof will be omitted herein.

The storage unit 1917 stores various programs, various data, and the like related to an operation related to an operation of transmitting and receiving a signal in a wireless communication system supporting an HARQ scheme, e.g., an operation of transmitting a codeword to a UE, receiving feedback information from the UE, and transmitting a codeword to the UE based on the feedback information performed by the BS 1900 under a control of the controller 1913.

The storage unit 1917 stores various signals and various messages which are received by the receiver 1915 from the other devices, e.g., the UE and/or the like.

While the transmitter 1911, the controller 1913, the receiver 1915, and the storage unit 1917 are described in the BS 1900 as separate units, it is to be understood that this is merely for convenience of description. In other words, two or more of the transmitter 1911, the controller 1913, the receiver 1915, and the storage unit 1917 may be incorporated into a single unit.

The BS 1900 may be implemented with one processor.

According to various embodiments of the present disclosure, a method for transmitting a signal in transmitting apparatus in a wireless communication system supporting a hybrid automatic repeat request (HARQ) scheme is provided. The method includes transmitting a signal to a receiving apparatus; detecting there is a need for a retransmission operation for the signal; and performing the retransmission operation for the signal based on at least one of a reception scheme used in the receiving apparatus and an interference characteristic of an interference signal.

Preferably, the performing the retransmission operation for the signal based on the at least one of the reception scheme used in the receiving apparatus and the interference characteristic of the interference signal includes generating a retransmission signal by applying a preset HARQ retransmission scheme if the reception scheme used in the receiving apparatus is a resource element (RE) grouping-based scheme; generating a final retransmission signal by performing RE group-based interleaving operation on the retransmission signal; and transmitting the final retransmission signal to the receiving apparatus. Here, the RE grouping-based scheme is a reception scheme which considers RE grouping.

Preferably, the performing the retransmission operation for the signal based on the at least one of the reception scheme used in the receiving apparatus and the interference characteristic of the interference signal includes generating an RE group for retransmission based on an RE group set index if the reception scheme used in the receiving apparatus is a resource element (RE) grouping-based scheme; generating a final retransmission signal by performing RE group-based interleaving operation on the retransmission signal; and transmitting the final retransmission signal to the receiving apparatus. Here, the RE grouping-based scheme is a reception scheme which considers RE grouping, and the RE group set index is an RE group set index indicating an RE group set in which a maximum number of RE groups for which retransmission is to be requested are included and which the receiving apparatus.

Preferably, the performing the retransmission operation for the signal based on the at least one of the reception scheme used in the receiving apparatus and the interference characteristic of the interference signal includes regenerating an RE group for retransmission based on an RE group index if the reception scheme used in the receiving apparatus is a resource element (RE) grouping-based scheme; generating a final retransmission signal by performing RE group-based interleaving operation on a retransmission signal; and transmitting the final retransmission signal to the receiving apparatus. Here, the RE grouping-based scheme is a reception scheme which considers RE grouping, and the RE group index is an RE group index indicating an RE group set for which retransmission is to be requested and which the receiving apparatus selects.

Preferably, the performing the retransmission operation for the signal based on the at least one of the reception scheme used in the receiving apparatus and the interference characteristic of the interference signal includes determining whether a dominant interference cell of the receiving apparatus is a cell which is capable of cooperating with the transmitting apparatus if the reception scheme used in the receiving apparatus is a resource element (RE) grouping-based scheme; if the dominant interference cell is not the cell which is capable of cooperating with the transmitting apparatus, selecting an RE group for transmission based on a reliability level per RE group detected in the receiving apparatus; if a number of the RE groups for retransmission is less than or equal to a threshold value, regenerating an RE group for retransmission; performing an RE group-based interleaving operation on a retransmission signal to generate a final retransmission signal; and transmitting the final retransmission signal and an RE group index to the receiving apparatus. Here, the RE grouping-based scheme is a reception scheme which considers RE grouping, and the RE group index is an RE group index indicating an RE group through which the retransmission signal is to be transmitted.

Preferably, the reliability level per RE group is detected based on a log-likelihood ratio (LLR) per bit which corresponds to an RE group, a symbol transition probability per RE included in the RE group, and an Euclidean distance per RE included in the RE group.

Preferably, the performing the retransmission operation for the signal based on the at least one of the reception scheme used in the receiving apparatus and the interference characteristic of the interference signal includes determining whether a dominant interference cell of the receiving apparatus is a cell which is capable of cooperating with the transmitting apparatus if the reception scheme used in the receiving apparatus is a resource element (RE) grouping-based scheme; if the dominant interference cell is the cell which is capable of cooperating with the transmitting apparatus, acquiring previous resource block (RB) allocation information of the dominant interference cell through a backhaul; selecting an RE group for retransmission based on a reliability level per RE group detected in the receiving apparatus and the previous RB allocation information; if a number of the RE groups for retransmission is less than or equal to a threshold value, regenerate an RE group for retransmission; performing an RE group-based interleaving operation on a retransmission signal to generate a final retransmission signal; and transmitting the final retransmission signal and an RE group index to the receiving apparatus. Here, the RE grouping-based scheme is a reception scheme which considers RE grouping, and the RE group index is an RE group index indicating an RE group through which the retransmission signal is to be transmitted.

Preferably, the reliability level per RE group is detected based on a log-likelihood ratio (LLR) per bit which corresponds to an RE group, a symbol transition probability per RE included in the RE group, and an Euclidean distance per RE included in the RE group.

Preferably, the performing the retransmission operation for the signal based on the at least one of the reception scheme used in the receiving apparatus and the interference characteristic of the interference signal includes acquiring previous resource block (RB) allocation information of a dominant interference cell of the receiving apparatus through a backhaul if the reception scheme used in the receiving apparatus is a resource element (RE) grouping-based scheme; selecting an RE group for retransmission based on a reliability level per RE group detected in the receiving apparatus and the previous RB allocation information; if a number of the RE groups for retransmission is less than or equal to a threshold value, regenerate an RE group for retransmission; performing an RE group-based interleaving operation on a retransmission signal to generate a final retransmission signal; and transmitting the final retransmission signal and an RE group index to the receiving apparatus. Here, the RE grouping-based scheme is a reception scheme which considers RE grouping, and the RE group index is an RE group index indicating an RE group through which the retransmission signal is to be transmitted.

Preferably, the reliability level per RE group is detected based on a log-likelihood ratio (LLR) per bit which corresponds to an RE group, a symbol transition probability per RE included in the RE group, and an Euclidean distance per RE included in the RE group.

According to various embodiments of the present disclosure, a method for receiving a signal in a receiving apparatus in a wireless communication system supporting a hybrid automatic repeat request (HARQ) scheme is provided. The method includes receiving a signal from a transmitting apparatus; generating feedback information for the signal based on at least one of a reception scheme used in the receiving apparatus and an interference characteristic of an interference signal; and transmitting the feedback information to the transmitting apparatus.

Preferably, the generating the feedback information includes generating negative-acknowledgment (NACK) information and reception scheme information indicating the reception scheme used in the receiving apparatus as the feedback information if a cyclic redundancy check (CRC) result for the signal indicates CRC fail. Here, the reception scheme is one of full-band cell-specific reference signal (CRS)-based scheme and an resource element (RE) grouping-based scheme, the full-band CRS-based scheme is a reception scheme which does not consider an interference characteristic, and the RE grouping-based scheme is a reception scheme which considers RE grouping.

Preferably, the generating the feedback information includes calculating a reliability per resource element (RE) group and select an RE group for retransmission if a cyclic redundancy check (CRC) result for the signal indicates CRC fail and the reception scheme used in the receiving apparatus is a full-band cell-specific reference signal (CRS)-based scheme; if a number of the RE groups for retransmission is less than or equal to a threshold value, selecting an RE group set in which a maximum number of RE groups for which retransmission is to be request are included; and generating an RE group set index indicating the RE group set, negative-acknowledgment (NACK) information, and reception scheme information indicating the full-band CRS-based scheme as the feedback information. Here, the full-band CRS-based scheme is a reception scheme which does not consider an interference characteristic.

Preferably, each of the reliability per RE group and the reliability level per RE group is detected based on a log-likelihood ratio (LLR) per bit which corresponds to an RE group, a symbol transition probability per RE included in the RE group, and an Euclidean distance per RE included in the RE group.

Preferably, the generating the feedback information includes calculating a reliability per resource element (RE) group and select an RE group for retransmission if a cyclic redundancy check (CRC) result for the signal indicates CRC fail and the reception scheme used in the receiving apparatus is a full-band cell-specific reference signal (CRS)-based scheme; and if a number of the RE groups for retransmission is less than or equal to a threshold value, generating an RE group index indicating the RE group, negative-acknowledgment (NACK) information, and reception scheme information indicating the full-band CRS-based scheme as the feedback information. Here, the full-band CRS-based scheme is a reception scheme which does not consider an interference characteristic.

Preferably, each of the reliability per RE group and the reliability level per RE group is detected based on a log-likelihood ratio (LLR) per bit which corresponds to an RE group, a symbol transition probability per RE included in the RE group, and an Euclidean distance per RE included in the RE group.

Preferably, the generating the feedback information includes detecting a reliability level per resource element (RE) group if a cyclic redundancy check (CRC) result for the signal indicates CRC fail and the reception scheme used in the receiving apparatus is a full-band cell-specific reference signal (CRS)-based scheme; and generating a cell identifier (ID) of at least one dominant interference cell, the reliability level per RE group, negative-acknowledgment (NACK) information, and reception scheme information indicating the full-band CRS-based scheme as the feedback information. Here, wherein the full-band CRS-based scheme is a reception scheme which does not consider an interference characteristic.

Preferably, each of the reliability per RE group and the reliability level per RE group is detected based on a log-likelihood ratio (LLR) per bit which corresponds to an RE group, a symbol transition probability per RE included in the RE group, and an Euclidean distance per RE included in the RE group.

As is apparent from the foregoing description, an embodiment of the present disclosure enables to transmit and receive a signal in a wireless communication system supporting an HARQ scheme.

An embodiment of the present disclosure enables to transmit and receive a signal based on an interference characteristic in a wireless communication system supporting an HARQ scheme.

An embodiment of the present disclosure enables to transmit and receive a signal based on a reception scheme in a wireless communication system supporting an HARQ scheme.

An embodiment of the present disclosure enables to transmit and receive a signal based on RE grouping in a wireless communication system supporting an HARQ scheme.

An embodiment of the present disclosure enables to transmit and receive a signal based on a reliability for an RE group in a wireless communication system supporting an HARQ scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmitting apparatus in a wireless communication system supporting a hybrid automatic repeat request (HARQ) scheme, the transmitting apparatus comprising:
a processor configured to:
transmit a signal to a receiving apparatus,
detect whether to perform a retransmission operation for the signal, and
perform the retransmission operation for the signal based on at least one of a reception scheme used in the receiving apparatus or an interference characteristic of an interference signal,
determine whether a dominant interference cell of the receiving apparatus is a cell that cooperates with the transmitting apparatus if the reception scheme used in the receiving apparatus is a resource element (RE) grouping-based scheme,
 if the dominant interference cell is not the cell that cooperates with the transmitting apparatus, select an RE group for transmission based on a reliability level for each RE group detected in the receiving apparatus,
 if a number of the RE groups for retransmission is less than or equal to a threshold value, regenerate an RE group for retransmission,
 perform an RE group-based interleaving operation on a retransmission signal to generate a final retransmission signal, and
 transmit the final retransmission signal and an RE group index to the receiving apparatus,
 wherein the RE grouping-based scheme is a reception scheme that considers RE grouping, the RE group index is an RE group index indicating an RE group through that the retransmission signal is to be transmitted, and the reliability level for each RE group is detected based on a log-likelihood ratio (LLR) per bit that corresponds to for each RE group, a symbol transition probability per RE included in each RE group, and an Euclidean distance per RE included in each RE group.

2. A transmitting apparatus in a wireless communication system supporting a hybrid automatic repeat request (HARQ) scheme, the transmitting apparatus comprising:
 a processor configured to:
  transmit a signal to a receiving apparatus,
  detect whether to perform a retransmission operation for the signal, and
  perform the retransmission operation for the signal based on at least one of a reception scheme used in the receiving apparatus or an interference characteristic of an interference signal,
 determine whether a dominant interference cell of the receiving apparatus is a cell that cooperates with the transmitting apparatus if the reception scheme used in the receiving apparatus is a resource element (RE) grouping-based scheme,
 if the dominant interference cell is the cell that cooperates with the transmitting apparatus, acquire previous resource block (RB) allocation information of the dominant interference cell through a backhaul,
 select an RE group for retransmission based on a reliability level for each group detected in the receiving apparatus and the previous RB allocation information,
 if a number of the RE groups for retransmission is less than or equal to a threshold value, regenerate an RE group for retransmission,
 perform an RE group-based interleaving operation on a retransmission signal to generate a final retransmission signal, and
 transmit the final retransmission signal and an RE group index to the receiving apparatus,
 wherein the RE grouping-based scheme is a reception scheme that considers RE grouping, the RE group index is an RE group index indicating an RE group through that the retransmission signal is to be transmitted, and the reliability level for each RE group is detected based on a log-likelihood ratio (LLR) per bit that corresponds to each RE group, a symbol transition probability per RE included in each RE group, and an Euclidean distance per RE included in each RE group.

3. A transmitting apparatus in a wireless communication system supporting a hybrid automatic repeat request (HARQ) scheme, the transmitting apparatus comprising:
 a processor configured to:
  transmit a signal to a receiving apparatus,
  detect whether to perform a retransmission operation for the signal, and
  perform the retransmission operation for the signal based on at least one of a reception scheme used in the receiving apparatus or an interference characteristic of an interference signal,
 acquire previous resource block (RB) allocation information of a dominant interference cell of the receiving apparatus through a backhaul if the reception scheme used in the receiving apparatus is a resource element (RE) grouping-based scheme,
 select an RE group for retransmission based on a reliability level for each RE group detected in the receiving apparatus and the previous RB allocation information,
 if a number of the RE groups for retransmission is less than or equal to a threshold value, regenerate an RE group for retransmission,
 perform an RE group-based interleaving operation on a retransmission signal to generate a final retransmission signal, and
 transmit the final retransmission signal and an RE group index to the receiving apparatus,
 wherein the RE grouping-based scheme is a reception scheme that considers RE grouping, the RE group index is an RE group index indicating an RE group through that the retransmission signal is to be transmitted, and the reliability level for each RE group is detected based on a log-likelihood ratio (LLR) per bit that corresponds to each RE group, a symbol transition probability per RE included in each RE group, and an Euclidean distance per RE included in each RE group.

4. A receiving apparatus in a wireless communication system supporting a hybrid automatic repeat request (HARQ) scheme, the receiving apparatus comprising:
 a processor configured to:
  receive a signal from a transmitting apparatus,
  generate feedback information for the signal based on at least one of a reception scheme used in the receiving apparatus or an interference characteristic of an interference signal, and transmit the feedback information to the transmitting apparatus,
  in response to a cyclic redundancy check (CRC) result for the signal indicating CRC fail and if the reception scheme used in the receiving apparatus is a full-band cell-specific reference signal (CRS)-based scheme, calculate a reliability for each resource element (RE) group and select an RE group for retransmission,
  if a number of the RE groups for retransmission is less than or equal to a threshold value, select an RE group set in which a maximum number of RE groups for which retransmission is to be request are included, and
  generate an RE group set index indicating the RE group set, negative-acknowledgment (NACK) information, and reception scheme information indicating the full-band CRS-based scheme as the feedback information,
 wherein the full-band CRS-based scheme is a reception scheme that does not consider an interference characteristic, and wherein the reliability for each RE group is detected based on a log-likelihood ratio (LLR) per bit that corresponds to each RE group, a symbol transition probability per RE included in each group, and an Euclidean distance per RE included in each group.

5. A receiving apparatus in a wireless communication system supporting a hybrid automatic repeat request (HARQ) scheme, the receiving apparatus comprising:
a processor configured to:
receive a signal from a transmitting apparatus,
generate feedback information for the signal based on at least one of a reception scheme used in the receiving apparatus or an interference characteristic of an interference signal, and transmit the feedback information to the transmitting apparatus,
in response to a cyclic redundancy check (CRC) result for the signal indicating CRC fail and if the reception scheme used in the receiving apparatus is a full-band cell-specific reference signal (CRS)-based scheme, calculate a reliability for each resource element (RE) group and select an RE group for retransmission, and
if a number of the RE groups for retransmission is less than or equal to a threshold value, generate an RE group index indicating the RE group, negative-acknowledgment (NACK) information, and reception scheme information indicating the full-band CRS-based scheme as the feedback information,
wherein the full-band CRS-based scheme is a reception scheme that does not consider an interference characteristic, and
wherein the reliability for each RE group is detected based on a log-likelihood ratio (LLR) per bit that corresponds to each RE group, a symbol transition probability per RE included in each RE group, and an Euclidean distance per RE included in each RE group.

* * * * *